United States Patent
Sharma et al.

(10) Patent No.: US 10,642,913 B2
(45) Date of Patent: May 5, 2020

(54) INTENT AND BOT BASED QUERY GUIDANCE

(71) Applicant: ACCENTURE GLOBAL SOLUTIONS LIMITED, Dublin (IE)

(72) Inventors: Vibhu Sharma, Bangalore (IN); Vikrant Kaulgud, Pune (IN); Rohit Mehra, Rohini (IN); Poulami Debnath, Gurgaon (IN); Milind Savagaonkar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 298 days.

(21) Appl. No.: 15/421,928

(22) Filed: Feb. 1, 2017

(65) Prior Publication Data

US 2018/0173808 A1 Jun. 21, 2018

(30) Foreign Application Priority Data

Dec. 21, 2016 (IN) .............................. 201641043670

(51) Int. Cl.
  *G06F 7/02* (2006.01)
  *G06F 16/00* (2019.01)
  *G06F 16/9535* (2019.01)
  *G06F 16/242* (2019.01)
  *G06F 16/903* (2019.01)

(52) U.S. Cl.
  CPC ........ *G06F 16/9535* (2019.01); *G06F 16/242* (2019.01); *G06F 16/903* (2019.01)

(58) Field of Classification Search
  CPC .............. G06F 16/9535; G06F 16/242; G06F 16/9538; G06F 16/903; G06F 16/95; G06F 16/951; G06F 16/00; G06N 5/02
  See application file for complete search history.

(56) References Cited

U.S. PATENT DOCUMENTS

| | | | |
|---|---|---|---|
| 2007/0011281 A1* | 1/2007 | Jhoney | G06Q 10/10 709/220 |
| 2015/0066479 A1* | 3/2015 | Pasupalak | G06F 17/27 704/9 |
| 2017/0243107 A1* | 8/2017 | Jolley | G06N 3/006 |
| 2018/0101533 A1* | 4/2018 | Robichaud | H04L 12/2816 |
| 2018/0124241 A1* | 5/2018 | Vijaywargi | H04M 3/5166 |
| 2018/0173714 A1* | 6/2018 | Moussa | G06F 17/279 |
| 2018/0174222 A1* | 6/2018 | Venkatakrishnan | G06Q 30/0633 |

* cited by examiner

*Primary Examiner* — Bruce M Moser
(74) *Attorney, Agent, or Firm* — Mannava & King, P.C.

(57) ABSTRACT

According to an example, intent and bot based query guidance may include receiving a query associated with a domain, and identifying, based on an analysis of the query, an intent of the query by extracting an action associated with the query and an entity associated with the query. An intent model associated with the query may be generated based on a mapping of the action and the entity with a domain model of the domain. An intent domain specific language representation of the intent model associated with the query may be generated. Based on an analysis of the intent domain specific language representation, a plurality of bots may be identified, and a parameterized bot chain may be generated to respond to the query. A runtime binding of bots of the parameterized bot chain may be performed, and invoked to generate the response to the query.

20 Claims, 20 Drawing Sheets

INTENT AND BOT BASED QUERY GUIDANCE

PRIORITY

The present application claims priority under 35 U.S.C. 119(a)-(d) to Indian patent application number 201641043670, having a filing date of Dec. 21, 2016, the disclosure of which is hereby incorporated by reference in its entirety.

BACKGROUND

In a work environment, a user may perform a variety of tasks that utilize different types of components. The components may be pre-selected for the user for performance of a task. As the task is being performed, the selection of the components may be modified based on changes in the user's needs. The selection of the components and/or modification of the selection may depend on a variety of factors.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
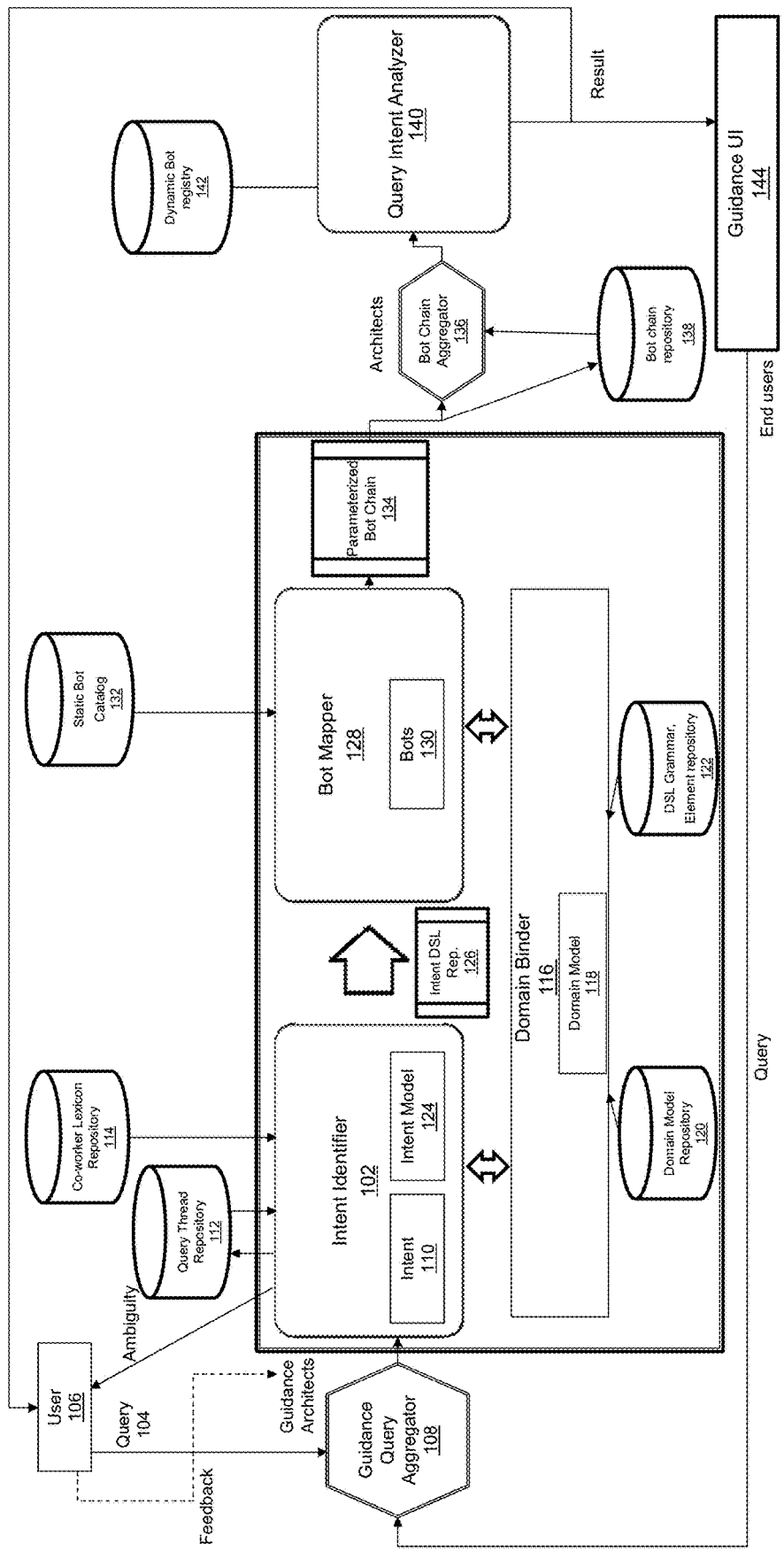
FIG. 1 illustrates an architecture of an intent and bot based query guidance system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An intent and bot based query guidance system, a method for intent and bot based query guidance, and a non-transitory computer readable medium having stored thereon machine readable instructions for intent and bot based query guidance are disclosed herein. A bot may be described as a software component that provides data or performs any task when accessed, invoked, and/or programmatically called. For example, bots may include passive data sources such a sensors, software components that process an input to provide a result, software components that may not provide any result (except possibly a status) but instead invoke another set of components, software components that may perform asynchronous operations including communicating with humans or any other hardware or software system, and other such components. Further, bots may or may not provide a result.

For the system, method, and non-transitory computer readable medium disclosed herein, digital co-workers may provide automation that would help personnel do their job in much more automated and effective manner. The functionality of a digital co-worker may be accomplished, for example, by using a bot or a combination of bots together. A digital co-worker may refer to the composite automation and the user interface, which may be formed by utilizing the functionality of one or more bots internally. A digital co-worker may be described as a computer automation which facilitates the performance of a job or some aspect of a job in an improved manner (e.g., faster, higher quality, etc.), or the performance of a newer type of job. Examples of application of digital co-workers may include field force automation, which is an area of providing automation to a set of workers who work in a field (i.e., operating geography of their domain) to perform different services or sales, etc. Other examples of application of digital co-workers may include telecom location based marketing, a speech to text system used by a support technician to log a telephone call, a law enforcement agent, while monitoring different closed-circuit television (CCTV) feeds, being assisted by a security co-worker that uses computer vision and facial recognition components to identify or verify a person from different video feed providing sub-systems, etc.

With respect to domains such as field force automation and other such domains, these types of domains may include a relatively large number of different processes, services, and data sources. In such domains with extensive domain models capturing relevant knowledge, technical challenges exist with respect to providing an automated co-worker functionality to provide advice and guidance in various scenarios. In this regard, domain models may represent models of knowledge (e.g., with respect to a domain) incorporated in a set of entities and actions, and the relationships between the entities and actions.

With respect to domains with extensive domain models, another technical challenge includes tying intents of subject matter experts or users into a technical model of bots present in an environment, working together to provide pertinent guidance and insight. For example, subject matter experts may know what kind of queries and functionalities may be needed by end users, but the subject matter experts may not be conversant with the complexities of a domain to translate the queries and functionalities into an actual co-worker which will provide the needed guidance. For example, subject matter experts who provide a relevant query may include analysts who may not have the skills (neither expected to have the skills) to create software systems (in this case co-workers) which will help answer the relevant query.

The system, method, and non-transitory computer readable medium disclosed herein address the aforementioned technical challenges by identifying intent or intents from a query or a set of queries (hereinafter generally referred to as the identification of intent from a query). Based on the intent identification, the system, method, and non-transitory computer readable medium disclosed herein generate an output including an assembly of available bots in an environment to provide the needed guidance for a query. In this regard, the system, method, and non-transitory computer readable medium disclosed herein process a query or a set of queries to detect context, temporal hints (i.e., temporal values), and possible actions and entities which may form the intent behind a query.

Context, as disclosed herein, may be described as keywords or parameters that may be used to relate a query to queries processed in the past. Thus, context may be used to categorize a new query as either similar (i.e., similar to an existing processed query), a follow-up (i.e., a follow-up query to an existing processed query based upon the query context), or novel (i.e., a completely different query that cannot be mapped to any existing contexts, hence needs to be processed as a new query).

Temporal hints, as disclosed herein, may be described as any inferred sequence of actions from a query.

An entity, as disclosed herein, may be described as a thing with distinct and independent existence, depending upon the domain. For example, jaguar may be comprehended as a car manufacturer in the automobile domain as opposed to an animal in the wildlife domain.

An action, as disclosed herein, may be described as operations that may be performed on and/or by an entity. For example, a car entity may have associated actions such as drive, park, check fuel, etc.

A domain model may be used by the system, method, and non-transitory computer readable medium disclosed herein to identify equivalent actions and entities. The actions and entities may be encoded along with temporal logic into a domain-specific language representation of intent. The domain-specific language representation of intent may be mapped to the functionality of available bots in an environment, and represented as a chain of the available bots. Multiple such query processing results may facilitate the generation of a combined architecture of bots which may operate together to produce guidance needed to respond to a query.

A domain model, as disclosed herein, may be described as a conceptual model of the domain that incorporates both behavior and data. The domain model may include domain-specific entities, corresponding actions and associated run-time instances of entities. A domain model may include two types of nodes. One set of nodes (each represented, for example, by a rectangle) may represent entities. The other set of nodes (each represented, for example, by a hexagon) may represent actions. Relationships may be denoted by edges. An edge may connect an entity and an action, and is associated with a text label that describes the relationship. These labels may be read in the direction of <entity node> to <action node>.

A logical module (with respect to temporal logic), as disclosed herein, may be described as a complete (or slice) of an existing intent model. A logical module may be used to identify and aggregate similar queries together.

An intent model, as disclosed herein, may be described as a model of entities and actions, and their relationship based on a query or a set of queries.

Temporal logic, as disclosed herein, may be described as a specific sequence of reusing existing logical modules to generate an intent model and a domain-specific language representation for forthcoming queries.

A domain specific language representation, as disclosed herein, may be described as a custom designed language with defined syntax, semantics, and grammar rules, applied to a particular domain to serve an intended purpose (compared to a general purpose language which may server a broad range of domains and applications).

A chain of bots, as disclosed herein, may be described as a specific set of bots that when executed in a defined sequence serve an intended purpose (e.g., generating a result set for a particular query).

With respect to combining bot chains, as disclosed herein, a union of multiple bot chains (i.e., the set of bots and the sequence of execution in each), may be used to generate an architecture of a co-worker (by software architects), which may be used to provide answers to a set of queries. The combining of multiple bot chains may need assistance from architects who, based on a specified consideration (e.g., how many instances of a bot can be executed based on the cost) and security requirements (e.g., which bots may not be invoked together because of security requirements), may provide authorization to aggregate bot chains. Alternatively, a bot chain (corresponding to one query) may be sent as it is for orchestration, or may be stored for future orchestration.

For the system, method, and non-transitory computer readable medium disclosed herein, an output with respect to the architecture of bots may be implemented into a running auto-generated guidance system based on the availability of different bots. The output may represent an answer (or answers) to a query and/or a set of queries. The output may also be forwarded to subject matter experts for providing feedback, for example, to determine whether the results adequately answer a query or set of queries.

The system, method, and non-transitory computer readable medium disclosed herein may be implemented with respect to a variety of technologies. For example, the system, method, and non-transitory computer readable medium disclosed herein may be implemented with respect to software development environments, field force automation, etc.

A technical problem associated with responding to a query is to properly analyze the query to determine a set of bots that may be used to respond to the query. As discussed herein, the system, method, and non-transitory computer readable medium disclosed herein are able to accurately identify an intent of a query by detecting context, temporal hints, and possible actions and entities which may form the intent behind a query. Based on the identified intent, an intent model associated with the query is generated based on a mapping of the actions and the entities with a domain model. Further, an intent domain specific language representation of the intent model associated with the query is generated. Based on an analysis of the intent domain specific language representation, a plurality of bots are identified, and a parameterized bot chain is generated to respond to the query. A runtime binding of bots of the parameterized bot chain is performed, and invoked to generate the response to the query. In this manner, the query is accurately analyzed based on the intent of the query, and a response to the query is generated by a specified set of bots. Further, the system, method, and non-transitory computer readable medium disclosed herein provide for smart assistance to an end-user, to assist the end-user in their day-to-day functionality within a specified domain, thereby improving the user's work efficiency. The system, method, and non-transitory computer readable medium disclosed herein also bring forth non-trivial information, with the information being aggregated and summarized from an underlying working system.

FIG. 1 illustrates an architecture of an intent and bot based query guidance system 100 (hereinafter "system 100"), according to an example of the present disclosure.

Referring to FIG. 1, the system 100 may include an intent identifier 102 to receive a query 104 from an analyst, a subject matter expert, and/or an end-user of the system 100 (hereinafter generally referred to as "user 106"). According to an example, the user 106 may have a general knowledge of the domain associated with the query 104. The query 104 may pertain to a question the user 106 may have with respect to a particular domain. Alternatively or additionally, a purpose of the query 104 may include providing the user 106 with assistance towards performance of a task associated with a particular domain.

A set of queries including the query 104 may be aggregated by the guidance query aggregator 108. For example, queries may be aggregated to interleave the queries. For example, queries may be received from different users of the system 100, and aggregated to interleave the queries. Queries which include the same meaning but use different wording approaches such as "Connect me to the XYZ project team lead" and "Who leads the XYZ project team", may be mapped to the same context.

The intent identifier 102 may analyze the query 104 (or a set of aggregated queries from the guidance query aggregator 108) to identify an intent 110 of the query 104. In order to identify the intent 110 of the query 104, the intent identifier 102 may apply natural language processing to the query 104 to ascertain a context of the query 104. Context, as disclosed herein, may be described as keywords or parameters that may be used to relate a query to queries processed in the past. Thus, context may be used to categorize a new query as either similar (i.e., similar to an existing processed query), a follow-up (i.e., a follow-up query to an existing processed query based upon the query context), or novel (i.e., a completely different query that cannot be mapped to any existing contexts, hence needs to be processed as a new query). In this regard, the intent identifier 102 may compare the query 104 to previously processed queries from a query thread repository 112 to categorize a new query as either similar, a follow-up, or novel.

In order to identify the intent 110 of the query 104, the intent identifier 102 may further analyze the query 104 to ascertain temporal hints. Temporal hints, as disclosed herein, may be described as any inferred sequence of actions from a query.

In order to identify the intent 110 of the query 104, the intent identifier 102 may further analyze the query 104 to extract possible actions and entities. An entity, as disclosed herein, may be described as a thing with distinct and independent existence, depending upon the domain. An action, as disclosed herein, may be described as operations that may be performed on and/or by an entity.

The intent identifier 102 may apply natural language processing to identify and/or ascertain the context, action, and entity information for terms in the query 104 to detect and resolve ambiguities for such terms. The ambiguity analysis may also be performed based on inquiries presented to the user 106, and responses to such inquiries.

The intent identifier 102 may operate in conjunction with a co-worker lexicon repository 114 to ascertain the meaning and/or equivalents of terms that are not present in previously analyzed queries.

The intent identifier 102 may operate in conjunction with a domain binder 116 to map extracted entities to a domain model 118, and to map extracted actions to the domain model 118. In this regard, the domain model 118 may be used by the domain binder 116 to identify equivalent actions and entities of the domain model 118 with respect to the extracted actions and entities from the query 104. The mapped actions and entities may be encoded along with temporal logic into a domain-specific language representation of intent. The temporal logic may represent a sequential arrangement of actions included in a query. For example, assuming that a query includes an action-B, the temporal logic in this case may be applied by the domain binder 116 to ascertain an action-A from the domain model 118 that may precede or that necessarily precedes the action-B, an action-C that may follow or necessarily follows the action-B, etc.

The domain model 118 may be selected from a plurality of domain models stored in a domain model repository 120. The domain model repository 120 may capture all relevant details of the domain models present in a catalog. For each domain model, associated information such as entity names and action names may be documented in their individual sets. Post the query processing phase, a set of words describing actions and entities may be derived. These derived actions and entities may be matched with the existing sets of actions and entities of the domain models of the domain model repository 120, and the domain model with the highest degree of matching may be selected.

The domain-specific language representation of intent may also be ascertained from a domain-specific language representation grammar and element repository 122. For example, commands related to retrieval of data, formatting of data, and operations that are to be performed on data from the query 104 may be ascertained from the domain-specific language representation grammar and element repository 122. The domain specific language representation of intent may be derived from the previously created intent model.

Based on identification of the intent 110 for the query 104, the intent identifier 102 may generate an intent model 124 associated with the particular domain model 118. The intent model 124 may be generated in a domain specific language representation which may be described as a custom designed language with defined syntax, semantics, and grammar rules, applied to a particular domain to serve an intended purpose. The domain specific language representation of the intent model 124 (denoted "intent domain specific language representation 126") may be forwarded to a bot mapper 128.

The bot mapper 128 may identify, based on the intent domain specific language representation 126, bots 130 from a static bot catalog 132 to generate a parameterized bot chain 134. The parameterized bot chain 134 may be described as a specific set of bots that when executed in a defined sequence serve an intended purpose (e.g., generating a result set for a particular query). The bot mapper 128 may identify the bots 130 based on a temporal chaining feasibility analysis that uses the temporal logic ascertained by the domain binder 116. In this regard, the bots may be documented in the static bot catalog 132, and by using the intent model 124 and the intent domain specific language representation 126, bots that fulfill a matching criteria (such as input consumed and output produced by a bot, its associated meta-data such as tags, category names, etc.) may be identified from the static bot catalog 132 and designed in the temporal chaining. With respect to bot identification, each entity may be associated with a number of actions in the domain model 118. Each action may be associated with a corresponding RESTful bot, the details of which may be documented in the static bot catalog 132.

The bot mapper 128 may also apply a gap analysis to identify any gaps in the parameterized bot chain 134. Any identified gaps may be flagged for completion, for example, by a subject matter expert.

The parameterized bot chain 134 may be aggregated with previously determined bot chains by a bot chain aggregator 136. The previously determined bot chains may be stored in a bot chain repository 138. Alternatively or additionally, the parameterized bot chain 134 may be aggregated with other parameterized bot chains associated with other queries by the bot chain aggregator 136. The aggregation of the bot chains may be performed based on a union of the bot chains. For example, assuming that each parameterized bot chain 134 includes a set of bots and a set of connections between the bots, the union may represent a set union of the set of bots and the set of connections between the bots of different parameterized bot chains.

With respect to combining bot chains, as disclosed herein, a union of multiple bot chains (i.e., the set of bots and the sequence of execution in each), may be used to generate an architecture of a co-worker (by software architects), which may be used to provide answers to a set of queries. The combining of multiple bot chains may need assistance from architects who, based on a specified consideration (e.g., how many instances of a bot can be executed based on the cost) and security requirements (e.g., which bots may not be invoked together because of security requirements), may provide authorization to aggregate bot chains. Alternatively, a bot chain (corresponding to one query) may be sent as it is for orchestration, or may be stored for future orchestration.

The parameterized bot chain 134 and/or the aggregated parameterized bot chains (from the bot chain aggregator 136) may be analyzed by a query intent analyzer 140 to perform a runtime binding of bots of the parameterized bot chain 134 and/or the aggregated parameterized bot chains, respectively. In this regard, the query intent analyzer 140 may utilize a dynamic bot registry 142 to perform the runtime binding of bots of the parameterized bot chain 134 and/or the aggregated parameterized bot chains. After the design of bot chain is completed, the execution may entail running these bots as and when they occur in the bot chain execution path. When a bot is to be executed, the dynamic bot registry may be accessed to retrieve the corresponding uniform record locator (URL). The dynamic bot registry 142 may include running instances of bots, where the running instances of bots may be used to perform the runtime binding of bots of the parameterized bot chain 134 and/or the aggregated parameterized bot chains.

Further to the runtime binding of bots, the query intent analyzer 140 may perform bot chain invocation. In this regard, the query intent analyzer 140 may invoke the set of bots of the parameterized bot chain 134 and/or the aggregated parameterized bot chains that have been subject to the runtime binding.

The query intent analyzer 140 may further implement an output (i.e., result) with respect to the architecture of bots into a running auto-generated guidance system (i.e., a guidance user interface 144) based on the availability of the different bots. The output may represent an answer (or answers) to the query 104 and/or a set of queries. The output may also be forwarded to subject matter experts as shown in FIG. 1 for providing feedback, for example, to determine whether the results adequately answer the query or the set of queries.

In some examples, the elements of the system 100 may be machine readable instructions stored on a non-transitory computer readable medium. In this regard, the system 100 may include or be a non-transitory computer readable medium. In some examples, the elements of the system 100 may be hardware or a combination of machine readable instructions and hardware.

Figure 2:
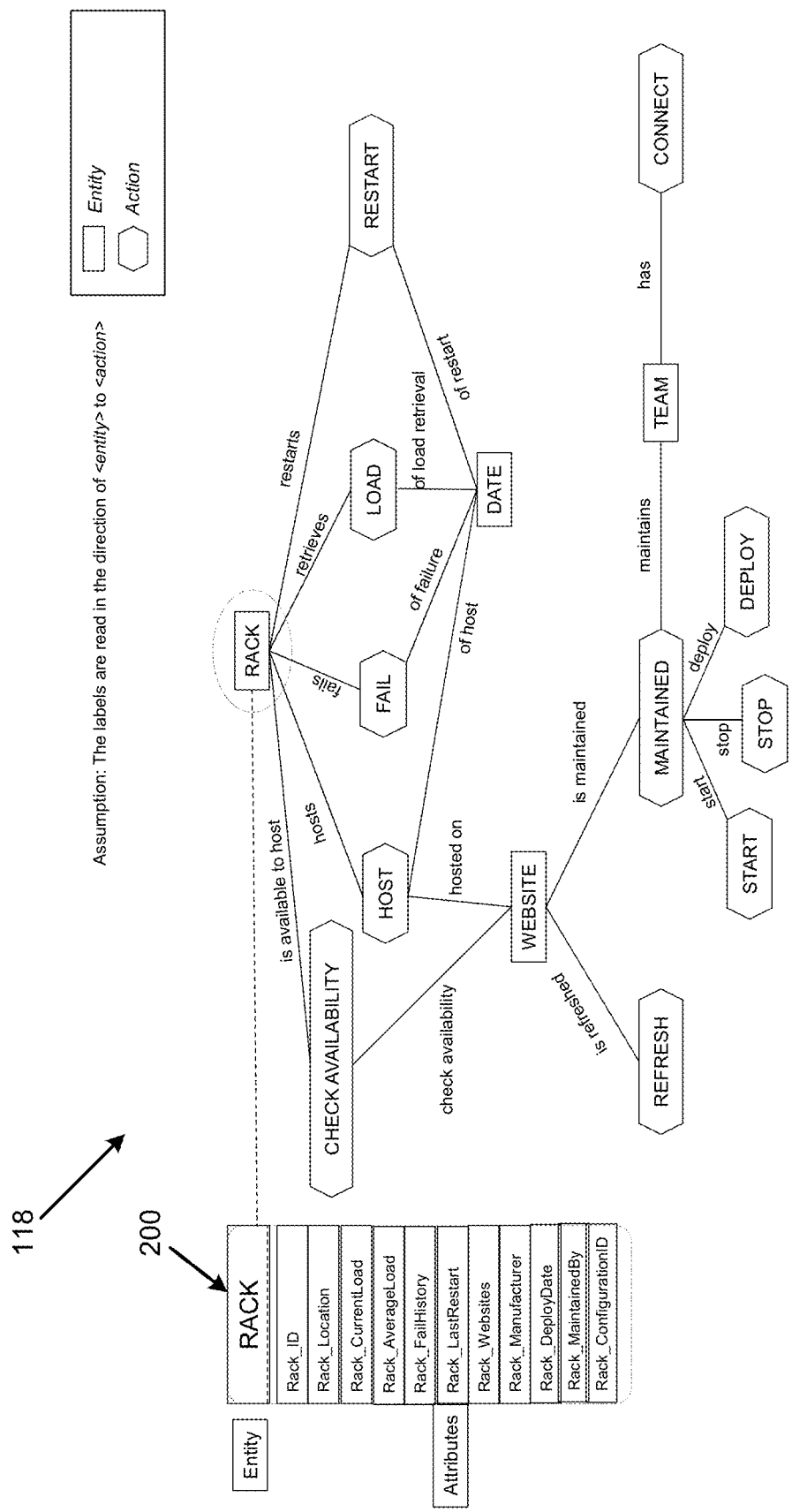
FIG. 2 illustrates a domain model in the area of field force automation for the intent and bot based query guidance system of FIG. 1, according to an example of the present disclosure.

FIG. 2 illustrates a domain model in the area of field force automation for the system 100, according to an example of the present disclosure. Although an actual domain model for the area of field force automation may be significantly larger compared to the domain model illustrated in FIG. 2, the domain model illustrated in FIG. 2 is provided for illustrating operation of the system 100.

Referring to FIG. 2, the domain model 118 for the area (i.e., domain) of field force automation may be used by the intent identifier 102 which operates in conjunction with the domain binder 116 to map extracted entities to the domain model 118, and to map extracted actions to the domain model 118. In this regard, the domain model 118 may be used by the domain binder 116 to identify equivalent actions and entities of the domain model 118 with respect to the extracted actions and entities from the query 104. For the domain model 118 of FIG. 2, entities may include "rack", "website", "date", and "team". Further, actions which may be performed on the entities may include "check availability", "host", "fail", "load", etc. For the domain model 118 of FIG. 2, the labels may be read in the direction of entity to action. For example, with respect to the "rack" entity and the "check availability" action, these labels may be read as "rack is available to host website". The "rack" entity as shown at 200 may include attributes "Rack-ID", "Rack_Location", etc.

Figure 3:
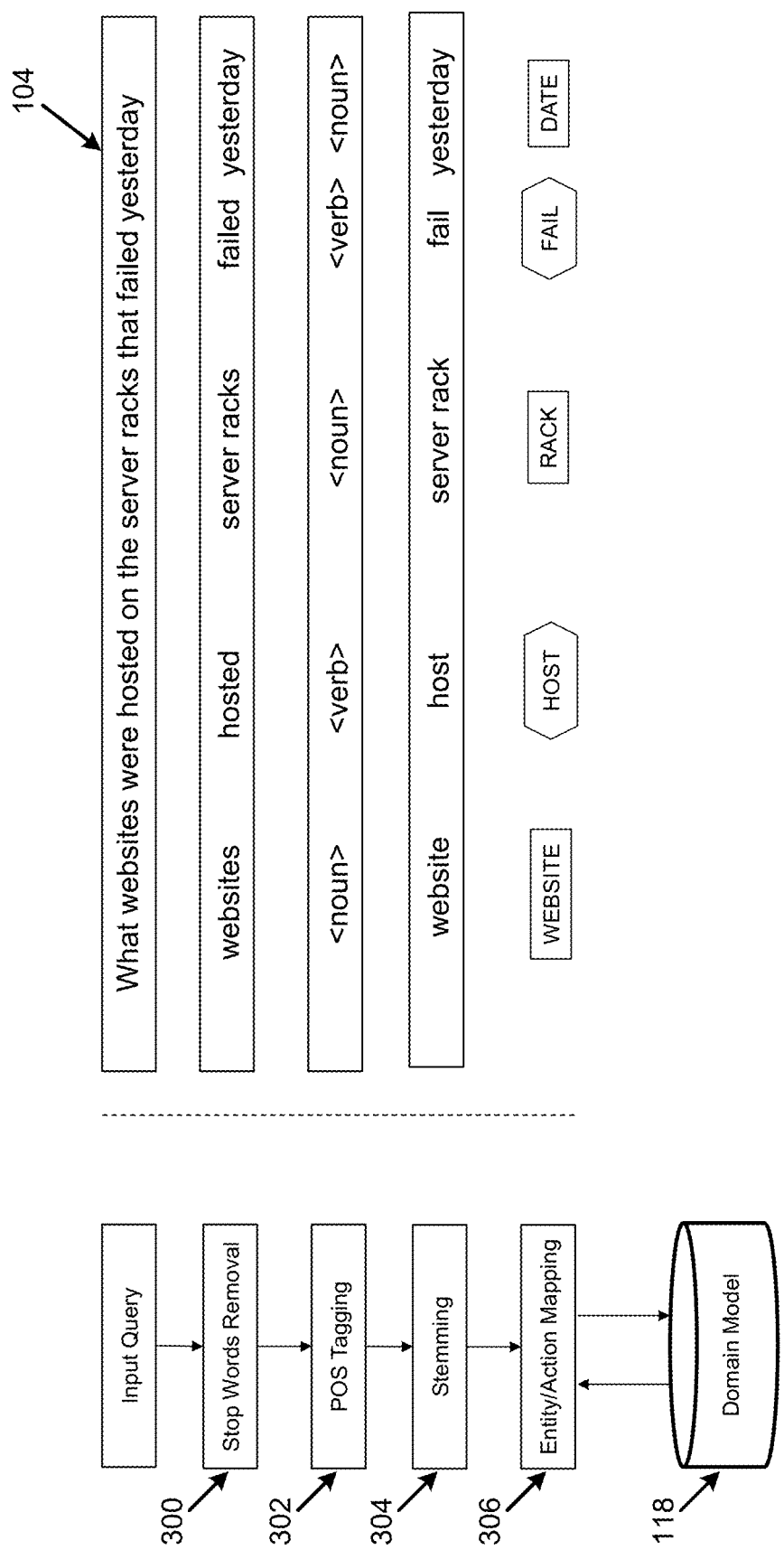
FIG. 3 illustrates query processing with respect to the field force automation example of FIG. 2 for the intent and bot based query guidance system of FIG. 1, according to an example of the present disclosure.

FIG. 3 illustrates query processing with respect to the field force automation example of FIG. 2 for the system 100, according to an example of the present disclosure.

With respect to FIGS. 2 and 3, and particularly FIG. 3, the query 104 (e.g., Query-1) may be specified as "What websites were hosted on the server racks that failed yesterday". The intent identifier 102 may determine the entity, action, and context for the query 104 as entities including website, rack, and date, actions including host and fail, and context being specified as novel. In order to determine the entity, action, and context for the query 104, the intent identifier 102 may implement natural language processing to remove stop words at 300, perform part-of-speech tagging at 302, perform stemming at 304 to convert keywords determined at 300 from a plural to a singular format, and entity/action mapping at 306 with the domain model 118 from FIG. 2 to determine the entities as "website", "rack", and "date", and actions as "host" and "fail".

Figure 4:
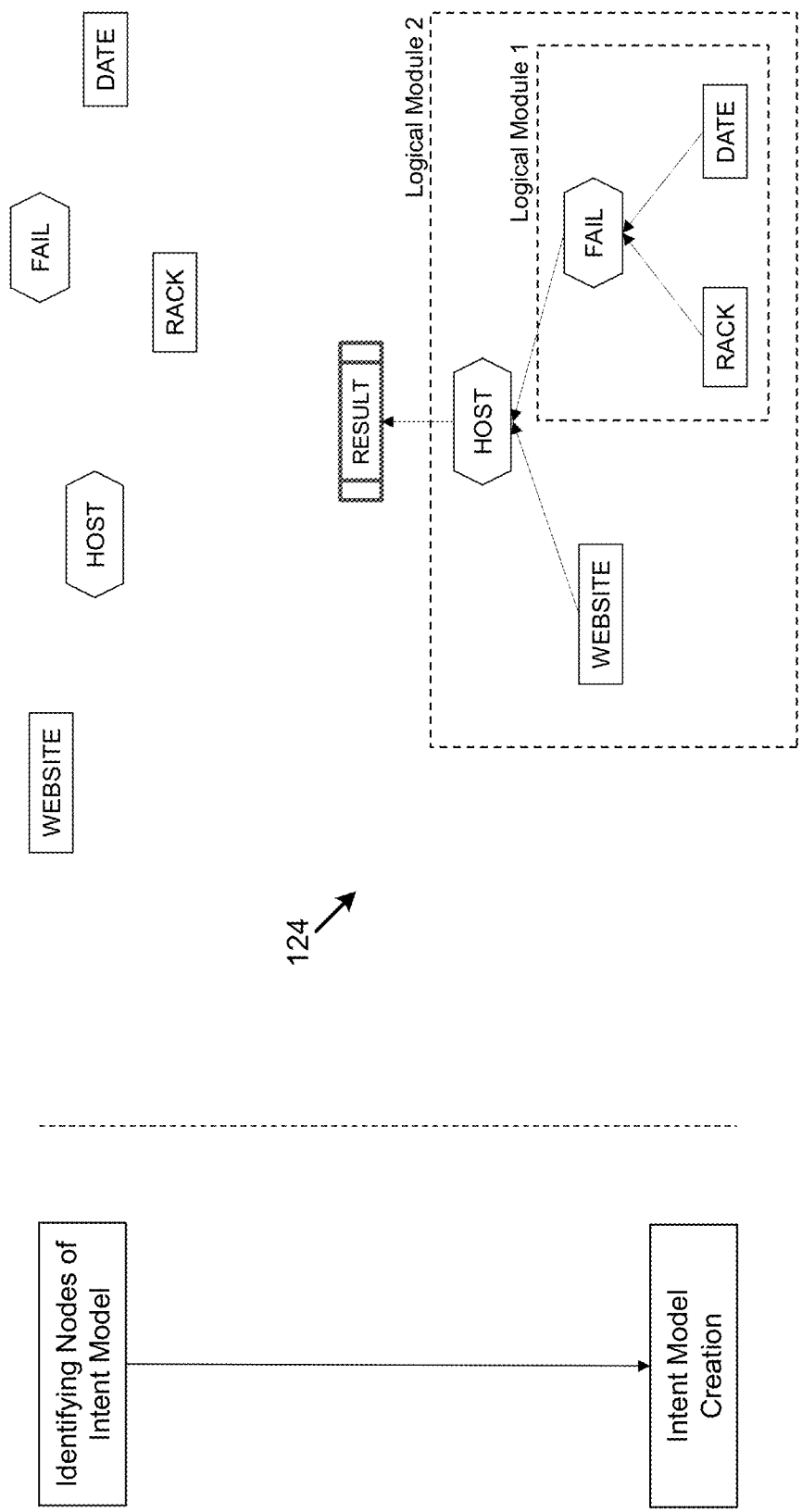
FIG. 4 illustrates an intent model with respect to the field force automation example of FIGS. 2-3 for the intent and bot based query guidance system of FIG. 1, according to an example of the present disclosure.

FIG. 4 illustrates an intent model with respect to the field force automation example of FIGS. 2-3 for the system 100, according to an example of the present disclosure.

As disclosed herein, a logical module (with respect to temporal logic), may be described as a complete (or slice) of an existing intent model, such as the intent model 124 of FIG. 4. A logical module may be used to identify and aggregate similar statements together. For the example of FIGS. 2-4, the intent model may include a logical module-1, and a logical module-2 which form the intent model 124. Logical module-1, which represents a lowest level logical module, may include the entities "rack" and "date" related to each other by the action "fail". Further, Logical module-2, which represents a higher level logical module, may include the entity "website" and the action "fail" related to each other by the action "host". In this manner, the intent model 124 may be formed to include a tiered arrangement of logical modules to generate a result as shown in FIG. 4.

The logical modules may also provide for the aggregation of similar queries. For example, if a further query indicates "what were the racks that failed last month", such a query may be aggregated to the query for the example of FIGS. 2-4 (i.e., "What websites were hosted on the server racks that failed yesterday") with respect to Logical module-1.

Figure 5:
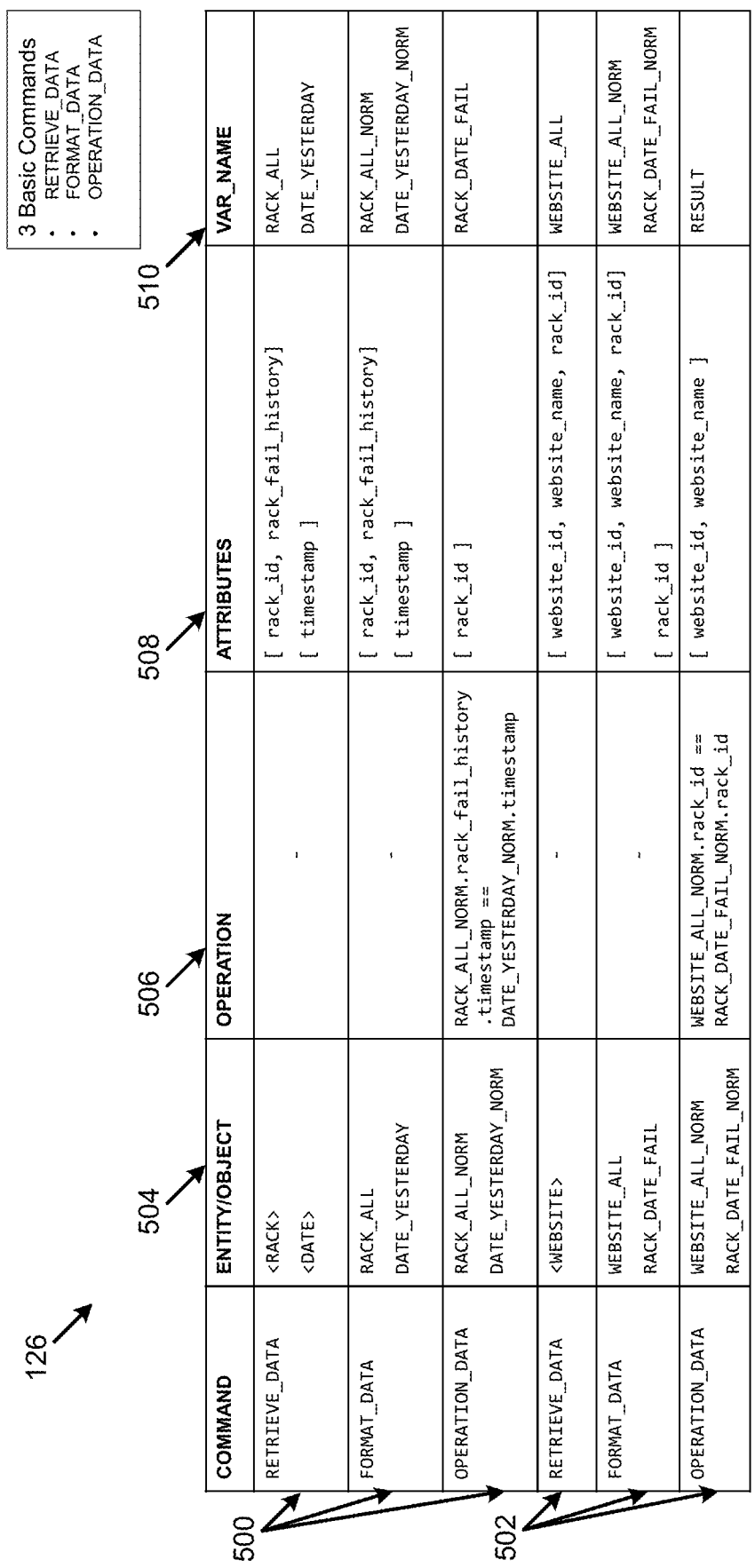
FIG. 5 illustrates an intent domain-specific language (DSL) pseudo code with respect to the field force automation example of FIGS. 2-4 for the intent and bot based query guidance system of FIG. 1, according to an example of the present disclosure.

FIG. 5 illustrates an intent domain-specific language pseudo code (i.e., the intent domain specific language representation 126) with respect to the field force automation example of FIGS. 2-4 for the system 100, according to an example of the present disclosure.

As disclosed herein, a domain specific language representation may be described as a custom designed language with defined syntax, semantics, and grammar rules, applied to a particular domain to serve an intended purpose (compared to a general purpose language which may server a broad range of domains and applications). In this regard, FIG. 5 illustrates a domain specific language used to describe bot chains.

Referring to FIG. 5, the intent domain specific language representation 126 may include commands "RETRIEVE_DATA", "FORMAT_DATA", "OPERATION_DATA" at 500 associated with the logical module-1 of FIG. 4, and commands "RETRIEVE_DATA", "FORMAT_DATA", "OPERATION_DATA" at 502 associated with the logical module-2 of FIG. 4. As shown at 504, 506, 508, and 510, the commands 500 and 502 may be respectively associated with an entity, an operation associated with the entity, attributes of the entity, and a variable name associated with the entity. For example, the command "OPERATION_DATA" at 500 may be associated with the entities "RACK_ALL_NORM" and "DATE_YESTERDAY_NORM", the operation "RACK_ALL_NORM.rack_fail_history.timestamp== DATE_YESTERDAY_NORM.timestamp", the attribute "rack_id", and the variable name "RACK_DATE_FAIL". The "FORMAT_DATA" command may be implemented to format the entity data to a standardized format (e.g., decimal, text, etc.). The "OPERATION_DATA" command may be implemented to perform a particular operation on the normalized entity data to determine intermediate results, and the final result as shown in FIG. 4. For the operation "RACK_ALL_NORM.rack_fail_history.timestamp== DATE_YESTERDAY_NORM.timestamp", this operation may identify the racks for which the fail history timestamp is equal to a yesterday timestamp (i.e., all of the racks that failed yesterday and were stored in the variable (VAR_NAME)). The intent domain specific language representation 126 may be derived from the previously created intent model 124. The intent model 124 may be traversed from bottom up. Whenever an entity node is encountered, instance values for that entity node may be retrieved using the RETRIEVE_DATA command (as present in the domain-specific language representation grammar and element repository 122) on that entity. Whenever an action node is encountered, the input instance values may be normalized using the FORMAT_DATA command, followed by the OPERATION_DATA command, which would perform the action required. For example, in FIG. 4, the intent model 124 has the bottom-most nodes as RACK and DATE entities. Hence, instance values for these entities, at that point of time, may be retrieved, and the command used for doing so, will be the RETRIEVE_DATA command. On moving up to the next higher level in the intent model 124, for the 'fail' action, the FORMAT_DATA command is issued followed by the OPERATION_DATA command. The variable name ("VAR_NAME") may represent the actual data associated with the entity, operation (if any), and attributes of the entity.

The commands "RETRIEVE_DATA", "FORMAT_DATA", "OPERATION_DATA" at 502 may be executed by the intent identifier 102 to generate the final result (i.e., RESULT) of the logical module-1 and the logical module-2 of FIG. 4.

Further, all variable names (VAR_NAME) may be normalized (_NORM) before further processing.

Figure 6:
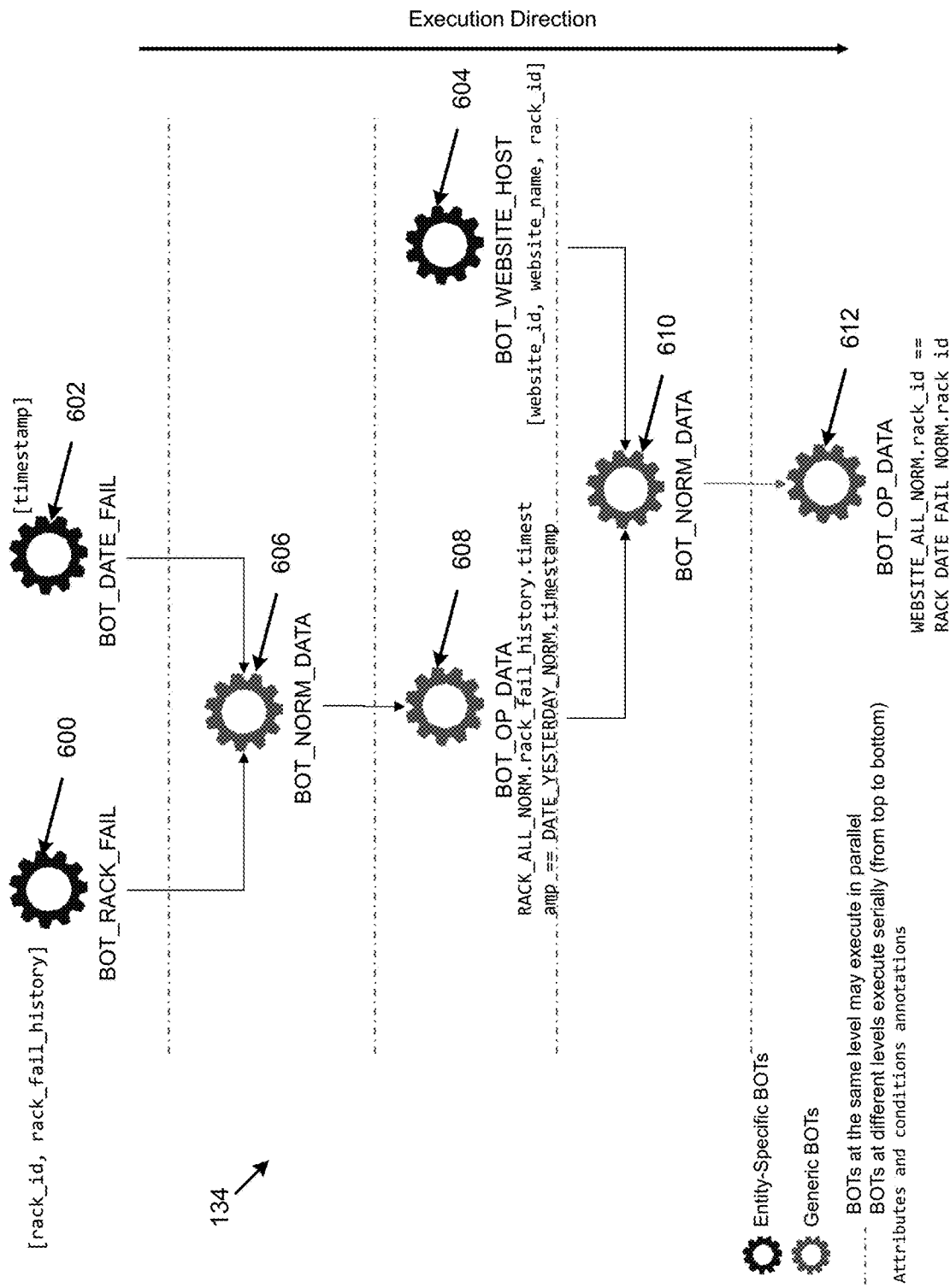
FIG. 6 illustrates a bot chain with respect to the field force automation example of FIGS. 2-5 for the intent and bot based query guidance system of FIG. 1, according to an example of the present disclosure.

FIG. 6 illustrates a bot chain with respect to the field force automation example of FIGS. 2-5 for the system 100, according to an example of the present disclosure. Bots associated with the intent domain specific language representation 126 may be specified as RESTful to provide interoperability between computer systems on the Internet.

As disclosed herein, a chain of bots may be described as a specific set of bots that when executed in a defined sequence, serve an intended purpose (e.g., generating a result set for a particular query). Referring to FIG. 6, the parameterized bot chain 134 may be used to generate a result set for the query "What websites were hosted on the server racks that failed yesterday".

Referring to FIG. 6, for the parameterized bot chain 134, the entity specific bots are displayed at 600, 602, and 604, and the generic bots are displayed at 606, 608, 610, and 612.

Every action associated with an entity (as per the domain model 118) may be a bot. For example, the "RACK" entity may include five actions (e.g., HOST, FAIL, LOAD, RESTART, CHECK AVAILABILITY). In this regard, the bots include BOT_RACK_HOST, BOT_RACK_FAIL, BOT_RACK_LOAD, BOT_RACK_RESTART, and BOT_RACK_AVAILABILITY. Thus, each bot may be associated with a particular action.

The entity specific bots displayed at 600, 602, and 604 may include the bot BOT_RACK_FAIL to provide failure history of rack instances, BOT_DATE_FAIL to provide timestamp details, and BOT_WEBSITE_HOST to provide hosted website details. These entity specific bots may correspond to the entities of the logical module-1 and logical module-2 of FIG. 4. Bots may be exposed as REST APIs, which would be accessed by selecting their respective URL values and receiving a response.

The generic bots displayed at 606, 608, 610, and 612 may include the bot BOT_NORM_DATA to format data appropriately, and BOT_OP_DATA to perform matching/equality operation. For example, the BOT_OP_DATA may perform a matching/equality operation to determine whether "RACK_ALL_NORM.rack_fail_history.timestamp== DATE_YESTERDAY_NORM.timestamp" (i.e., identify the racks for which the fail history timestamp is equal to a yesterday timestamp, or in other words, identify all of the racks that failed yesterday and were stored in the variable (VAR_NAME) of FIG. 5). The generic bots displayed at 606, 608, 610, and 612 may be fed input parameters and equality conditions to be applied on the inputs. Referring to FIG. 5, the inputs to the command OPERATION_DATA at 500 are RACK_ALL_NORM and DATE_YESTERDAY_NORM. The output of the command OPERATION_DATA at 500 will be RACK_DATE_FAIL.

With respect to determination of the parameterized bot chain 134, using the flow of the intent model 124 and the details obtained from the intent domain specific language representation 126, a corresponding parameterized bot chain 134 may be created as shown in FIG. 6.

For the parameterized bot chain 134, bots at the same level may execute in parallel. Further, bots at different levels may execute serially (e.g., from top to bottom in the orientation of FIG. 6).

Figure 7:
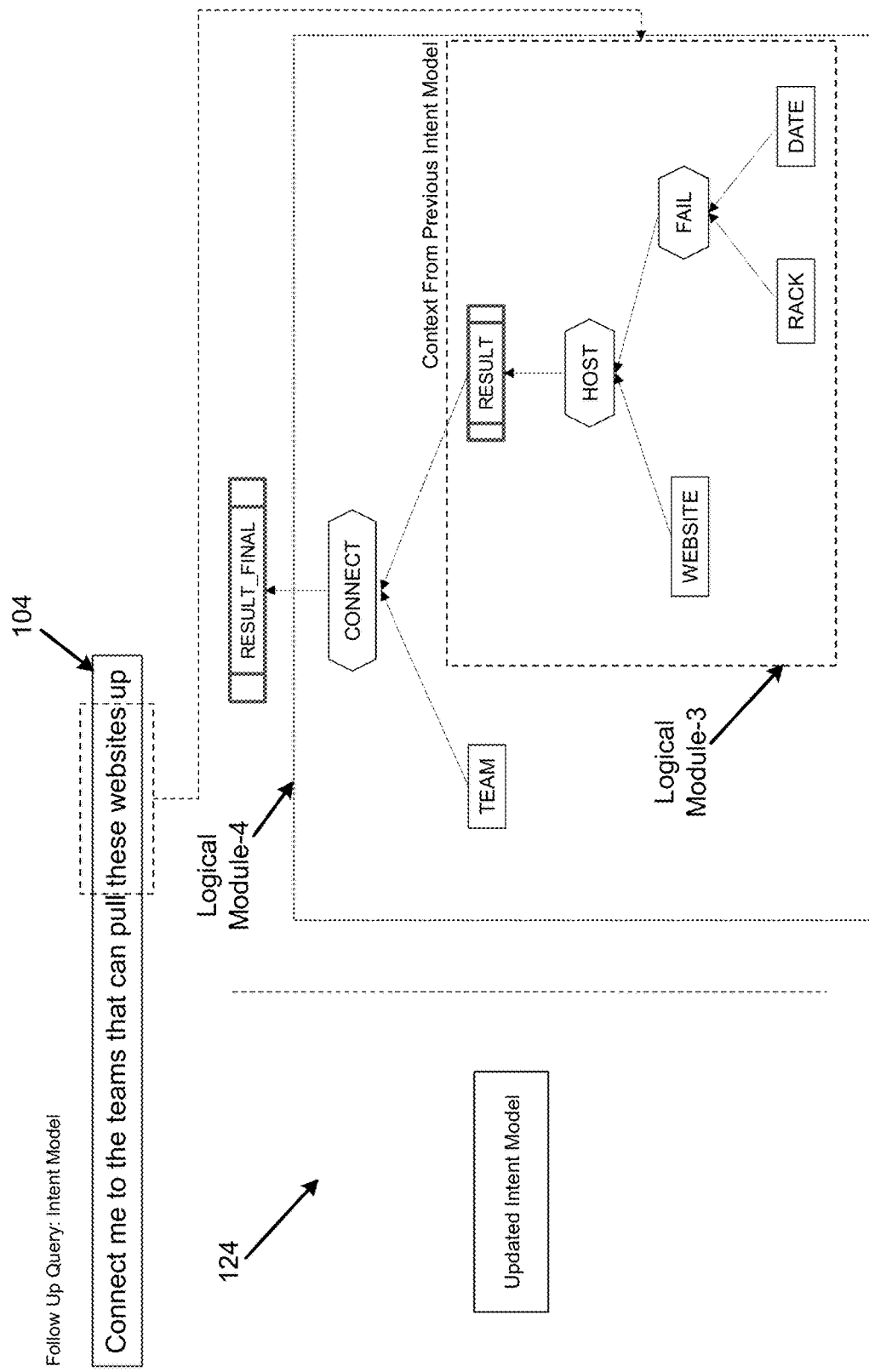
FIG. 7 illustrates a follow-up query intent model with respect to the field force automation example of FIGS. 2-6 for the intent and bot based query guidance system of FIG. 1, according to an example of the present disclosure.

FIG. 7 illustrates a follow-up query intent model with respect to the field force automation example of FIGS. 2-6 for the system 100, according to an example of the present disclosure.

With respect to FIGS. 2-7, and particularly FIG. 7, a follow-up query 104 (e.g., Query-2) may be specified as "Connect me to the teams who can pull these websites up. The intent identifier 102 may determine the entity, action, and context for the query 104 as entities including me, team, and website, actions including connect and pull, and context being specified as follow-up to Query-1 with temporal hint (connect occurs before pull).

As disclosed herein, temporal logic may be described as a specific sequence of reusing existing logical modules to generate an intent model and a domain-specific language representation for forthcoming queries. As shown in FIG. 7, a previously generated intent model (which is also a logical module; illustrated as logical module-3) may be used to generate the intent model 124 for the follow-up query 104. In this regard, the entity "team" of the updated intent model of FIG. 7 may be related to the "result" of the intent model of FIG. 4 (i.e., the result of the query 104 of FIG. 3), which is now a logical module (e.g., logical module-3) with respect to the updated intent model of FIG. 7, by the action "connect" (from the follow-up query) to generate the final result (i.e., RESULT_FINAL).

Figure 8:
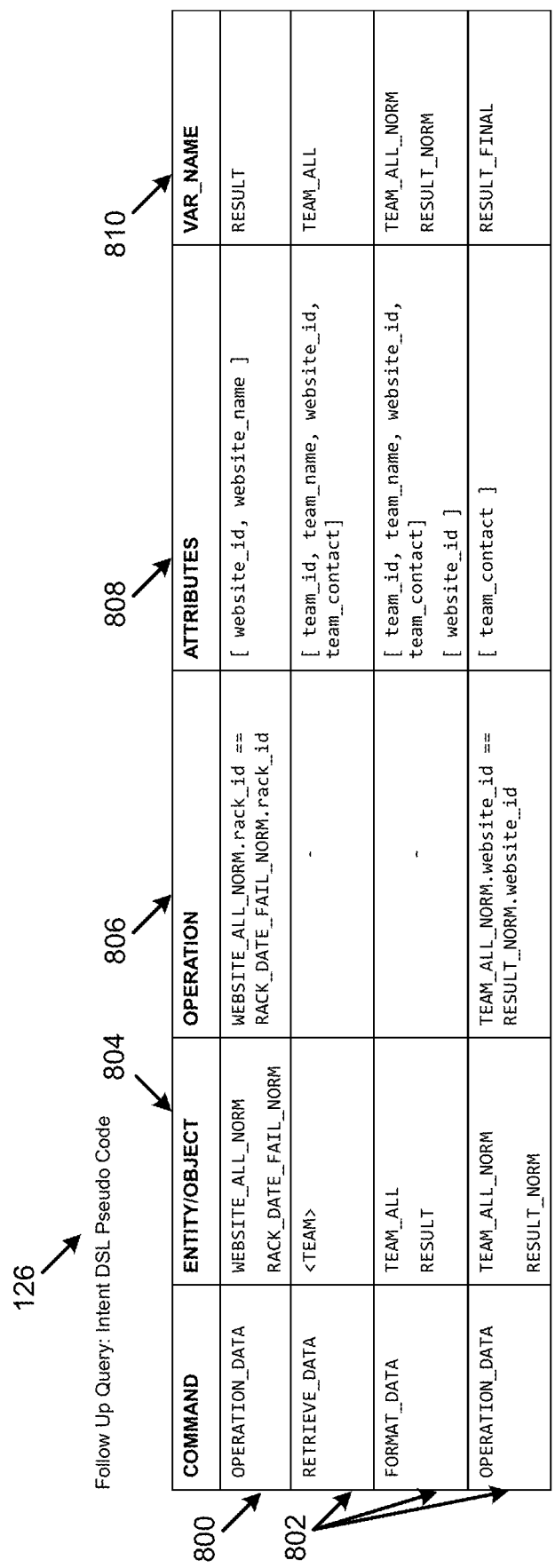
FIG. 8 illustrates a follow-up query domain-specific language pseudo code with respect to the field force automation example of FIGS. 2-7 for the intent and bot based query guidance system of FIG. 1, according to an example of the present disclosure.

FIG. 8 illustrates a follow-up query domain-specific language pseudo code (i.e., the intent domain specific language representation 126) with respect to the field force automation example of FIGS. 2-7 for the system 100, according to an example of the present disclosure.

Referring to FIG. 8, the intent domain specific language representation 126 may include command "OPERATION_DATA" at 800 associated with the logical module-3 that represents the intent model of FIG. 4, and commands "RETRIEVE_DATA", "FORMAT_DATA", "OPERATION_DATA" at 802 associated with the updated portion of the intent model for the follow-up query 104 (as shown in FIG. 7). As shown at 804, 806, 808, and 810, the commands 802 may be respectively associated with an entity, an operation associated with the entity, attributes of the entity, and a variable name associated with the entity. For example, the command "OPERATION_DATA" at 802 may be associated with the entities "TEAM_ALL_NORM" and "RESULT_NORM", the operation "TEAM_ALL_NORM.website_id==RESULT_NORM.website_id", the attribute "team_contact", and the variable name "RESULT_FINAL". The variable name ("VAR_NAME") may represent the actual data associated with the entity, operation (if any), and attributes of the entity.

The commands "RETRIEVE_DATA", "FORMAT_DATA", "OPERATION_DATA" at 802 may be executed by the intent identifier 102 to generate the final result (i.e., RESULT_FINAL) of the logical module-3 and logical module-4 of FIG. 7.

Figure 9:
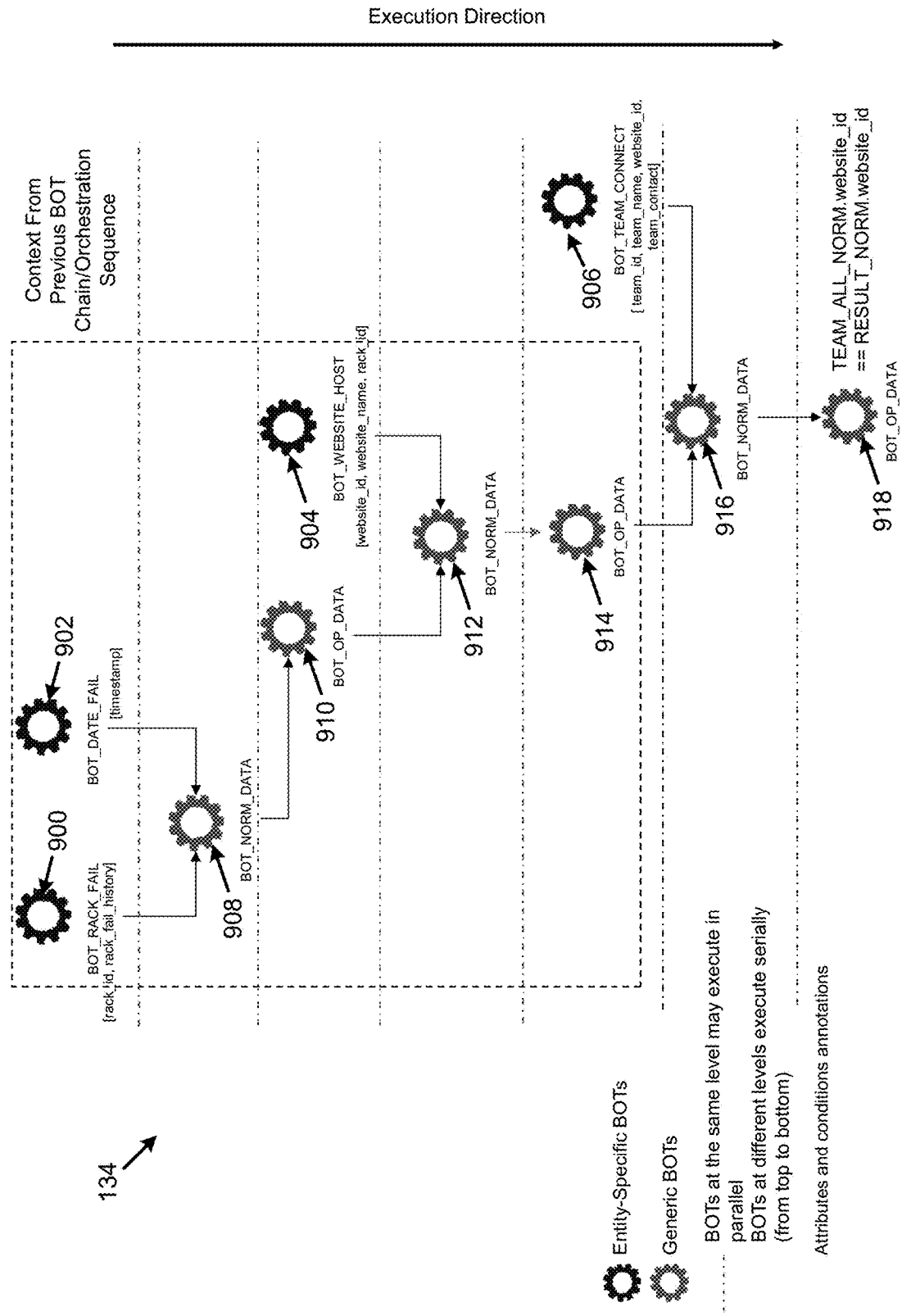
FIG. 9 illustrates a bot chain with respect to the field force automation example of FIGS. 2-8 for the intent and bot based query guidance system of FIG. 1, according to an example of the present disclosure.

FIG. 9 illustrates a bot chain with respect to the field force automation example of FIGS. 2-8 for the system 100, according to an example of the present disclosure.

Referring to FIG. 9, for the parameterized bot chain 134, the entity specific bots are displayed at 900, 902, 904, and 906, and the generic bots are displayed at 908, 910, 912, 914, 916, and 918. The bots 900, 902, 904, 908, 910, 912, and 914 represent the context from the bot chain of FIG. 6, and the bots 906, 916, and 918 represent the bots with respect to the follow-up inquiry of FIG. 7. With respect to the parameterized bot chain 134 of FIG. 9, this parameterized bot chain 134 may be generated by re-using the parameterized bot chain 134 of FIG. 6, and building the larger parameterized bot chain 134 of FIG. 9 on top of the parameterized bot chain 134 of FIG. 6.

Figure 10:
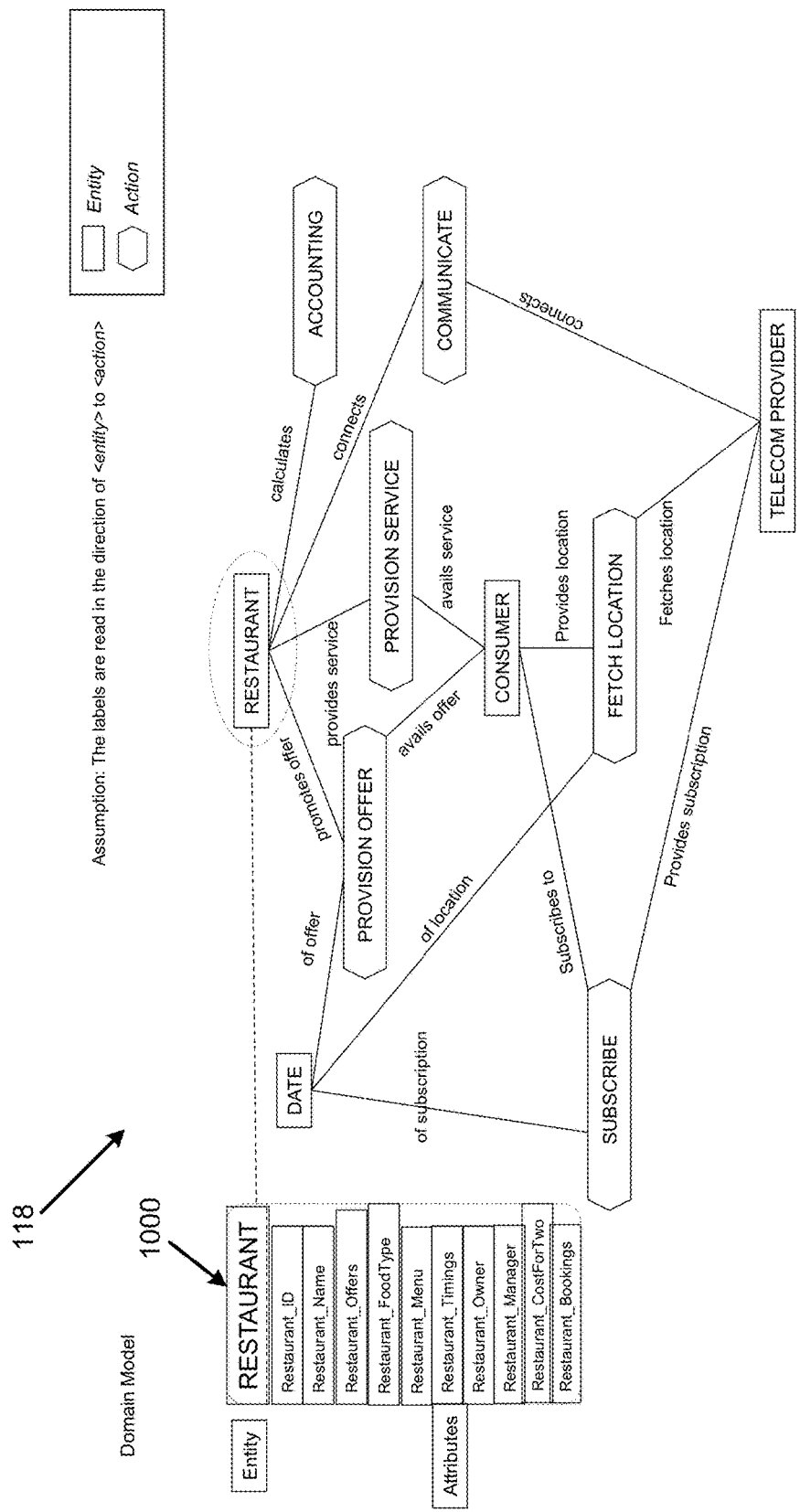
FIG. 10 illustrates a domain model in the area of telecom location based marketing for the intent and bot based query guidance system of FIG. 1, according to an example of the present disclosure.

FIG. 10 illustrates a domain model in the area of telecom location based marketing for the system 100, according to an example of the present disclosure. Although an actual domain model for the area of telecom location based marketing may be significantly larger compared to the domain model illustrated in FIG. 10, the domain model illustrated in FIG. 10 is provided for illustrating operation of the system 100.

Referring to FIG. 10, the domain model 118 for the area (i.e., domain) of telecom location based marketing may be used by the intent identifier 102 which operates in conjunction with the domain binder 116 to map extracted entities to the domain model 118, and to map extracted actions to the domain model 118. In this regard, the domain model 118 may be used by the domain binder 116 to identify equivalent actions and entities of the domain model 118 with respect to the extracted actions and entities from the query 104. For the domain model 118 of FIG. 10, entities may include "restaurant", "date", "consumer", and "telecom provider". Further, actions which may be performed on the entities may include "provision offer", "provision service", "accounting", etc. The "restaurant" entity as shown at 1000 may include attributes "Restaurant-ID", "Restaurant_Name", etc. The "date", "consumer", and "telecom provider" entities may similarly include attributes.

Figure 11:
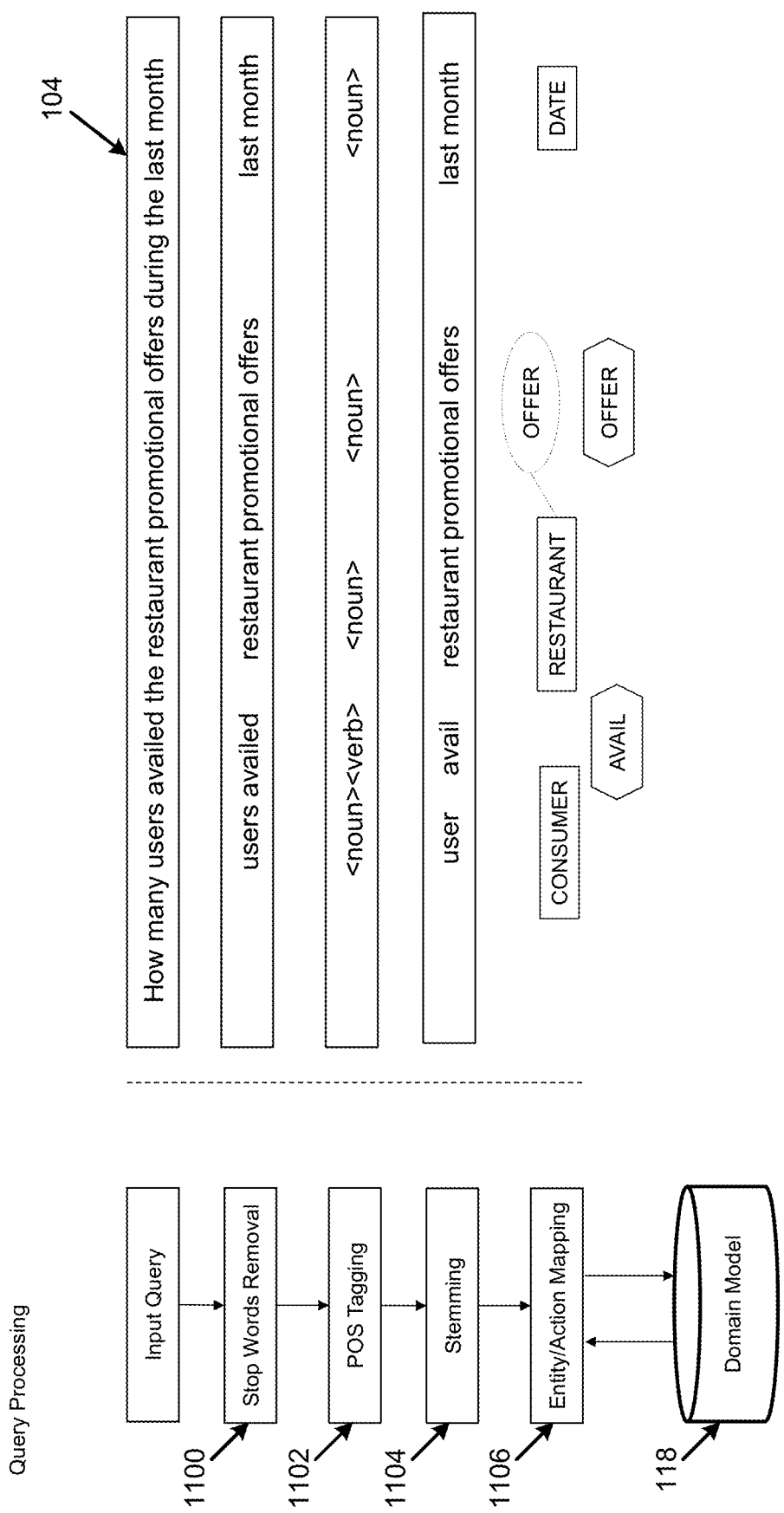
FIG. 11 illustrates query processing with respect to the telecom location based marketing example of FIG. 10 for the intent and bot based query guidance system of FIG. 1, according to an example of the present disclosure.

FIG. 11 illustrates query processing with respect to the telecom location based marketing example of FIG. 10 for the system 100, according to an example of the present disclosure.

With respect to FIGS. 10 and 11, and particularly FIG. 1, the query 104 may be specified as "How many users availed the restaurant promotional offers during the last month". The intent identifier 102 may determine the entity, action, and context for the query 104 as entities including consumer, restaurant, and date, actions including avail and offer, and context being specified as novel. In order to determine the entity, action, and context for the query 104, the intent identifier 102 may implement natural language processing to remove stop words at 1100, perform part-of-speech tagging at 1102, perform stemming at 1104 to convert keywords determined at 1100 from a plural to a singular format, and entity/action mapping at 1106 with the domain model 118 from FIG. 10 to determine the entities as "consumer", "restaurant", and "date", and actions as "avail", and "offer".

Figure 12:
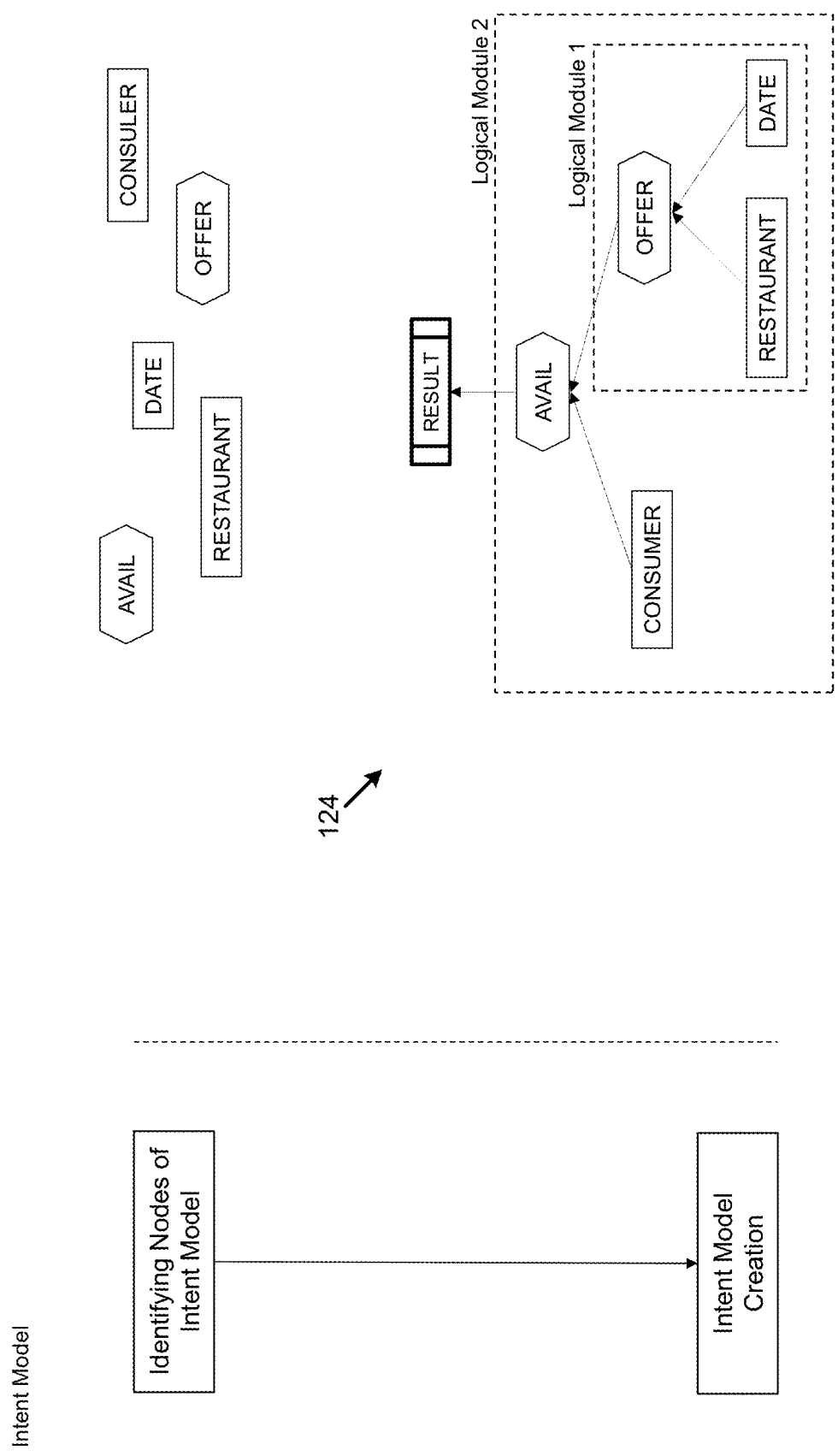
FIG. 12 illustrates an intent model with respect to the telecom location based marketing example of FIGS. 10-11 for the intent and bot based query guidance system of FIG. 1, according to an example of the present disclosure.

FIG. 12 illustrates an intent model with respect to the telecom location based marketing example of FIGS. 10-11 for the system 100, according to an example of the present disclosure.

For the example of FIGS. 10-12, the intent model may include a logical module-1, and a logical module-2 which form the intent model 124. Logical module-1, which represents a lowest level logical module, may include the entities "restaurant" and "date" related to each other by the action "offer". Further, Logical module-2, which represents a higher level logical module, may include the entity "consumer" related to the action "offer" by the action "avail". In this manner, the intent model 124 may be formed of a tiered arrangement of logical modules to generate a result as shown in FIG. 12.

Figure 13:
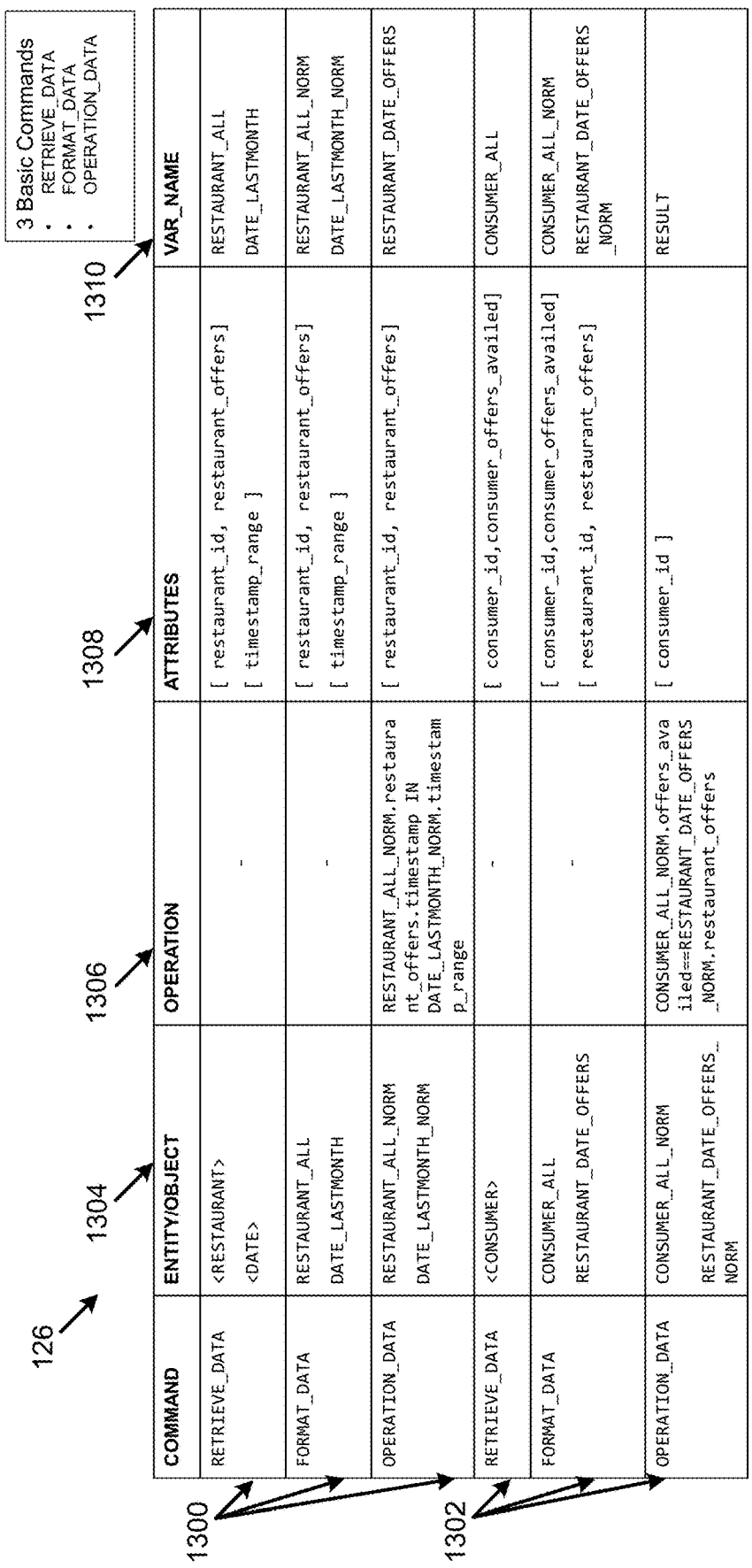
FIG. 13 illustrates an intent domain-specific language pseudo code with respect to the telecom location based marketing example of FIGS. 10-12 for the intent and bot based query guidance system of FIG. 1, according to an example of the present disclosure.

FIG. 13 illustrates an intent domain-specific language pseudo code (i.e., the intent domain specific language representation 126) with respect to the telecom location based marketing example of FIGS. 10-12 for the system 100, according to an example of the present disclosure.

Referring to FIG. 13, the intent domain specific language representation 126 may include commands "RETRIEVE_DATA", "FORMAT_DATA", "OPERATION_DATA" at 1300 associated with the logical module-1 of FIG. 12, and commands "RETRIEVE_DATA", "FORMAT_DATA", "OPERATION_DATA" at 1302 associated with the logical module-2 of FIG. 12. As shown at 1304, 1306, 1308, and 1310, the commands 1300 and 1302 may be associated with an entity, an operation associated with the entity, attributes of the entity, and a variable name associated with the entity. For example, the command "OPERATION_DATA" at 1300 may be associated with the entities "RESTAURANT_ALL_NORM" and "DATE_LASTMONTH_NORM", the operation "RESTAURANT_ALL_NORM.restaurant_offers.timestamp IN DATE_LASTMONTH_NORM.timestamp_range", the attributes "restaurant_id" and "restaurant_offers", and the variable name "RESTAURANT_DATE_OFFERS". The "FORMAT_DATA" command may be implemented to format the entity data to a standardized format (e.g., decimal, text, etc.). The "OPERATION_DATA" command may be implemented to perform a particular operation on the normalized entity data to determine intermediate results, and the final result (i.e., RESULT) as shown in FIG. 12. For the operation "RESTAURANT_ALL_NORM.restaurant_offers.timestamp IN DATE_LASTMONTH_NORM.timestamp_range", this operation may identify the restaurants for which the offer timestamp is equal to a last month timestamp (i.e., all of the restaurants that had an offer last month and were stored in the variable (VAR_NAME)). The variable name ("VAR_NAME") may represent the actual data associated with the entity, operation (if any), and attributes of the entity.

The commands "RETRIEVE_DATA", "FORMAT_DATA", "OPERATION_DATA" at 1302 may be executed by the intent identifier 102 to generate the final result of the logical module-1 and the logical module-2 of FIG. 12.

Figure 14:
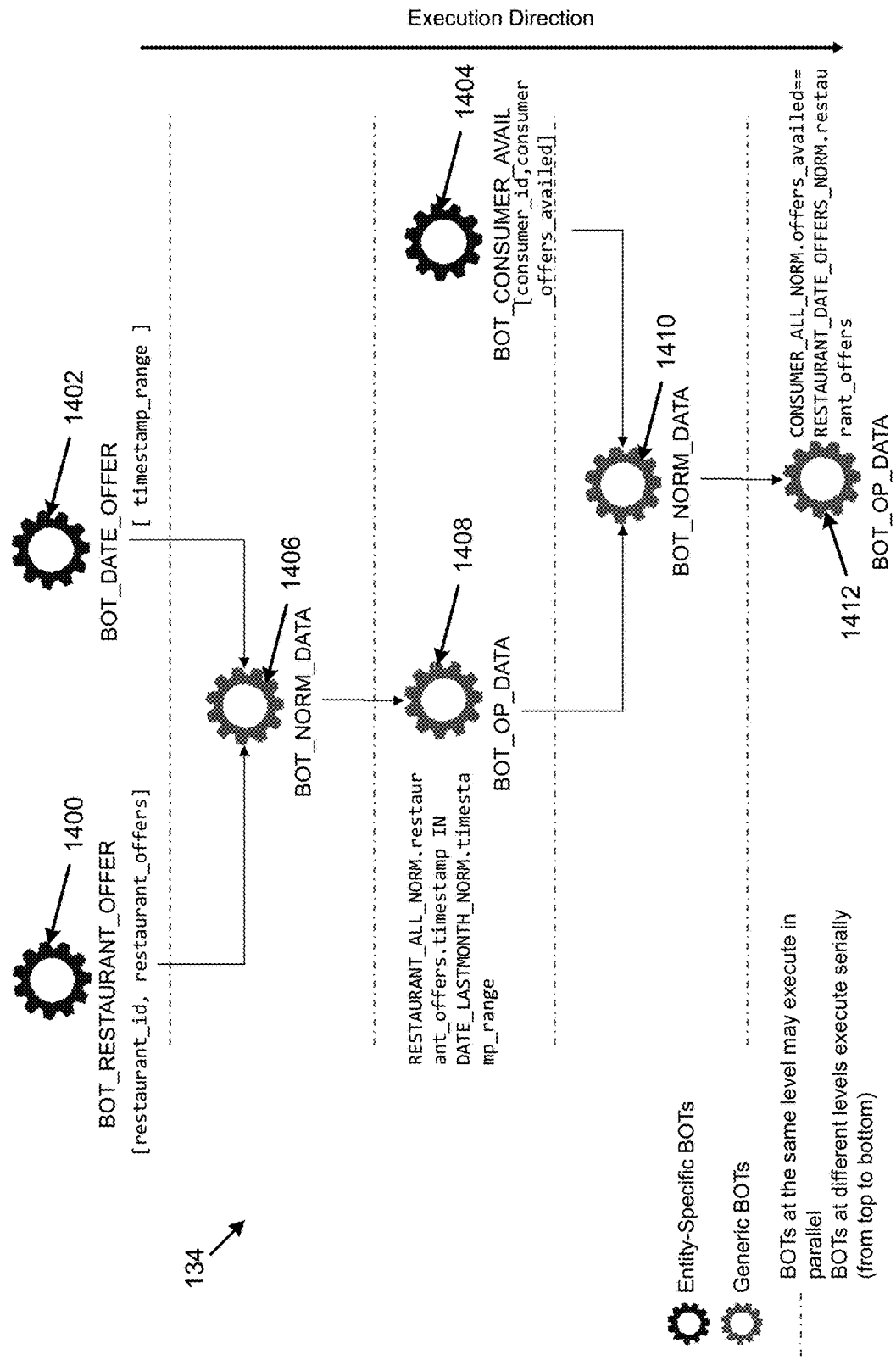
FIG. 14 illustrates a bot chain with respect to the telecom location based marketing example of FIGS. 10-13 for the intent and bot based query guidance system of FIG. 1, according to an example of the present disclosure.

FIG. 14 illustrates a bot chain with respect to the telecom location based marketing example of FIGS. 10-13 for the system 100, according to an example of the present disclosure.

Referring to FIG. 14, for the parameterized bot chain 134, the entity specific bots are displayed at 1400, 1402, and 1404, and the generic bots are displayed at 1406, 1408, 1410, and 1412.

Every action associated with an entity (as per the domain model 118) may be a bot. For example, the "RESTAURANT" entity may include four actions (e.g., PROVISION OFFER, PROVISION SERVICE, COMMUNICATE, ACCOUNTING). In this regard, the bots include BOT_RESTAURANT_OFFER, BOT_RESTAURANT_SERVICE, BOT_RESTAURANT_COMMUNICATE, and BOT_RESTAURANT_ACCOUNTING. Thus, each bot may be associated with a particular action.

The entity specific bots displayed at 1400, 1402, and 1404 may include the bot BOT_RESTAURANT_OFFER to provide offer information of a restaurant, BOT_DATE_OFFER to provide timestamp details, and BOT_CONSUMER_AVAIL to provide information about offers availed by a consumer. These entity specific bots may correspond to the entities of the logical module-1 and logical module-2 of FIG. 12.

The generic bots displayed at 1406, 1408, 1410, and 1412 may include the bot BOT_NORM_DATA to format data appropriately, and BOT_OP_DATA to perform matching/equality operation. For example, the BOT_OP_DATA may perform a matching/equality operation to determine whether "RESTAURANT_ALL_NORM.restaurant_offers.timestemp IN DATE_LASTMONTH_NORM.timestamp_range" (i.e., identify the restaurants for which the offer timestamp is equal to a last month timestamp, or in other words, identify all of the restaurants that had an offer last month and were stored in the variable (VAR_NAME)). The generic bots displayed at 1406, 1408, 1410, and 1412 may be fed input parameters and equality conditions to be applied on the inputs.

Figure 15:
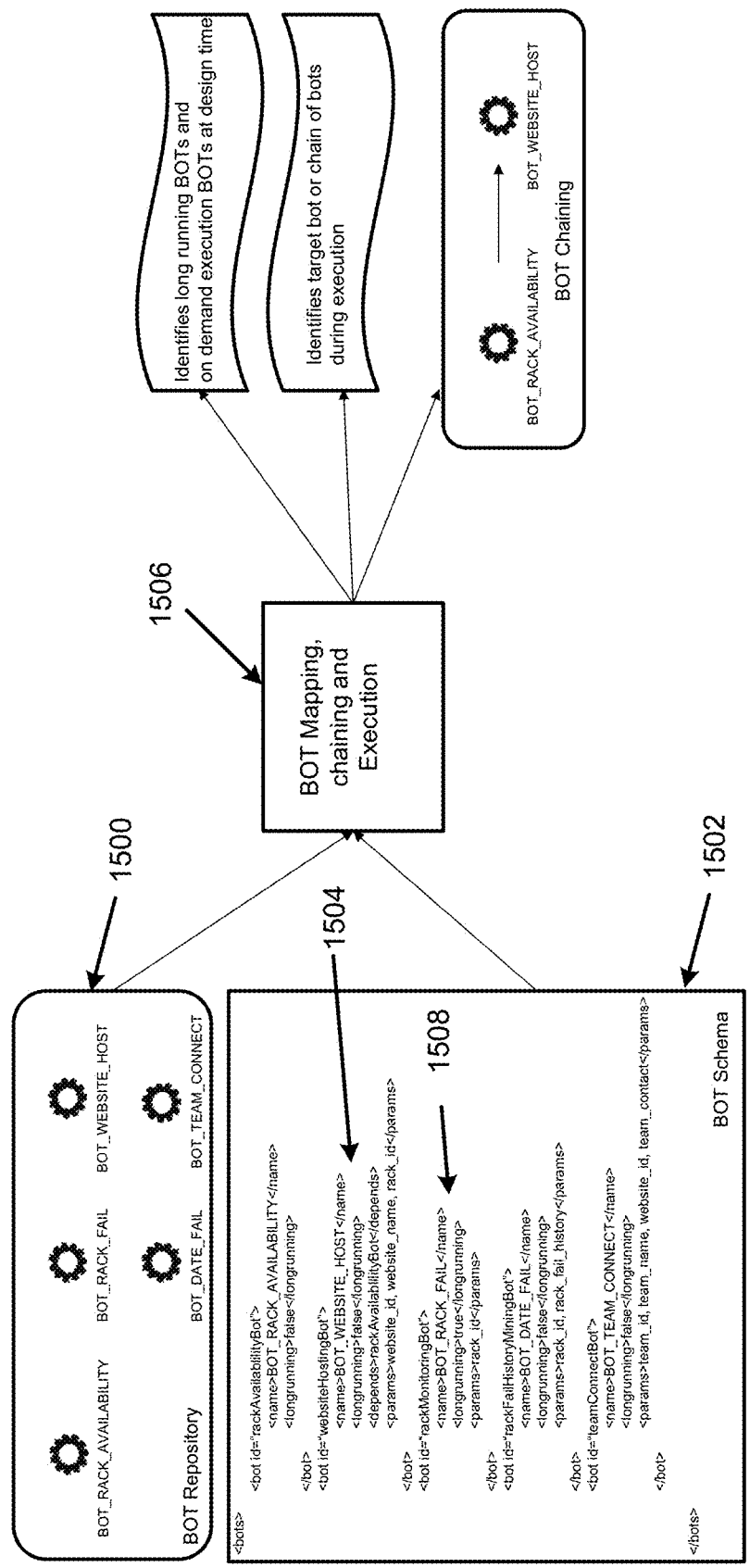
FIG. 15 illustrates an intent execution architecture example for the intent and bot based query guidance system of FIG. 1, according to an example of the present disclosure.

FIG. 15 illustrates an intent execution architecture example for the system 100, according to an example of the present disclosure.

Referring to FIG. 15, bots that are included in the parameterized bot chain 134 for a particular query 104 may be included in a bot repository as illustrated at 1500. The schema at 1502 may include the parameters that a bot may accept. For example, the bot "BOT_WEBSITE_HOST" at 1504 accepts the parameters website_id, website_name, and rack_id. Further, the schema at 1502 may include the sequence of bots that may be specified so that bots may be executed based on the specified sequence. The schema at 1502 may also identify the dependency between multiple bots. For example, the bot "BOT_WEBSITE_HOST" at 1504 depends on the bot "BOT_RACK_AVAILABILITY". For a given query 104, a bot mapping, chaining, and execution component as shown at 1506 of the bot mapper 128 and the query intent analyzer 140 may identify the available bots from the bot repository illustrated at 1500, and per the schema at 1502, determine whether an independent bot from the bot repository illustrated at 1500 is to be executed, or whether a chain of bots is to be executed. The schema at 1502 may also include a specification of whether a bot is a long running bot (i.e., a bot that is executed for greater than a specified number of times in a given time period, or for a specified time duration in the given time period).

Figure 16:
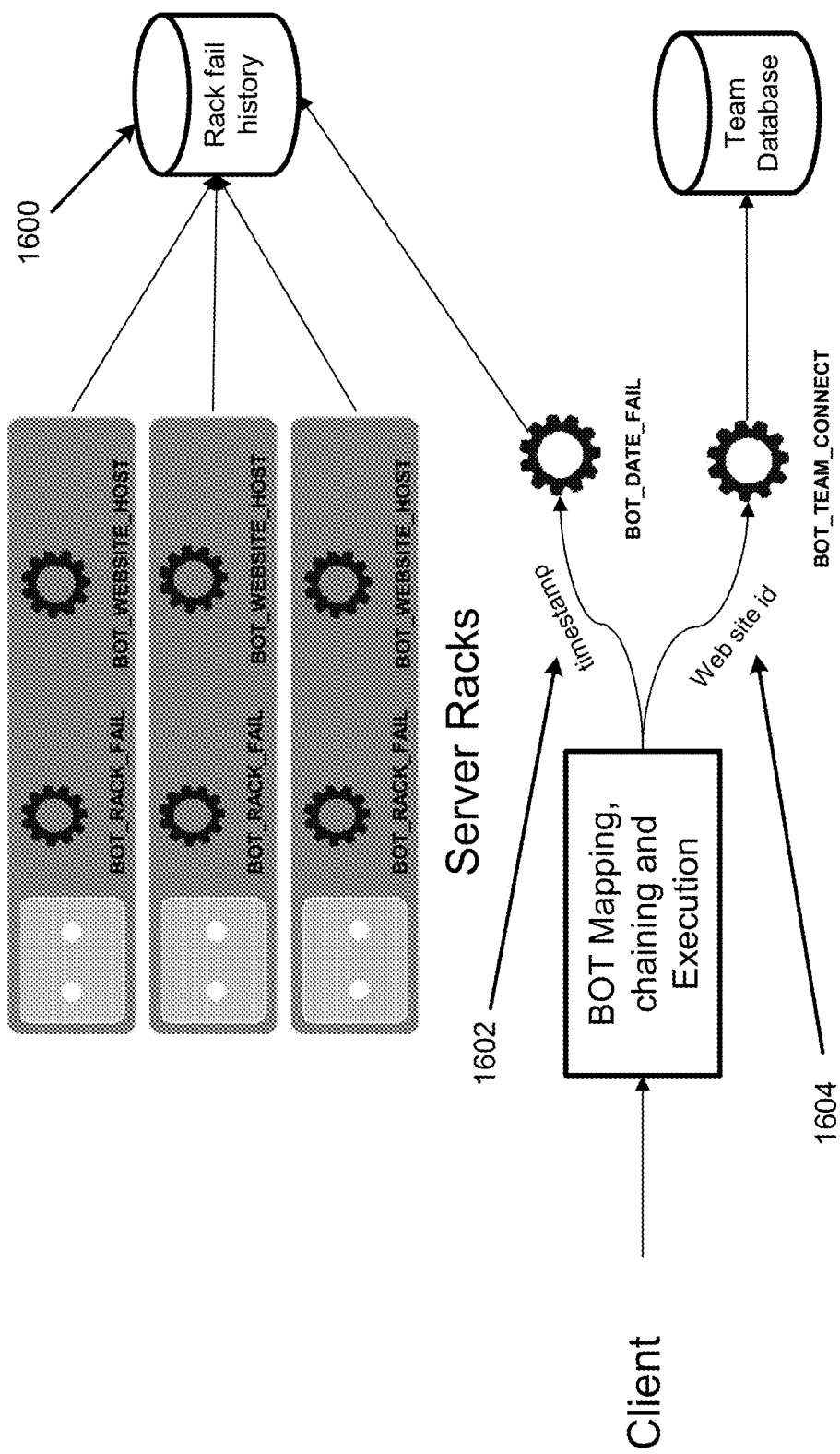
FIG. 16 illustrates a serverless architecture with respect to the field force automation example of FIGS. 2-9 for the intent and bot based query guidance system of FIG. 1, according to an example of the present disclosure.

FIG. 16 illustrates a serverless architecture with respect to the field force automation example of FIGS. 2-9 for the system 100, according to an example of the present disclosure.

Referring to FIGS. 15 and 16, for the bots included in the bot repository illustrated at 1500 and the bot schema at 1502, each of the bots may be updated based on the corresponding parameters of the bots. For example, the "BOT_RACK_FAIL" bot at 1508 may be updated at any indicated failure of a rack including a specified rack_id. As shown in FIG. 16, the failure history of a bot may be stored in a rack fail history repository at 1600.

In order to execute the query 104 of FIG. 2 (i.e., "What websites were hosted on the server racks that failed yesterday"), a parameter input to the bot schema at 1502 includes a timestamp (i.e., associated with yesterday) as shown at 1602, and the "BOT_DATE_FAIL" bot may be identified for execution. The response based on execution of the "BOT_DATE_FAIL" bot may be sent to the "BOT_TEAM_CONNECT" bot to determine a team member (i.e., team_contact) associated with the particular website specified by a website_id as shown at 1604.

Figure 17:
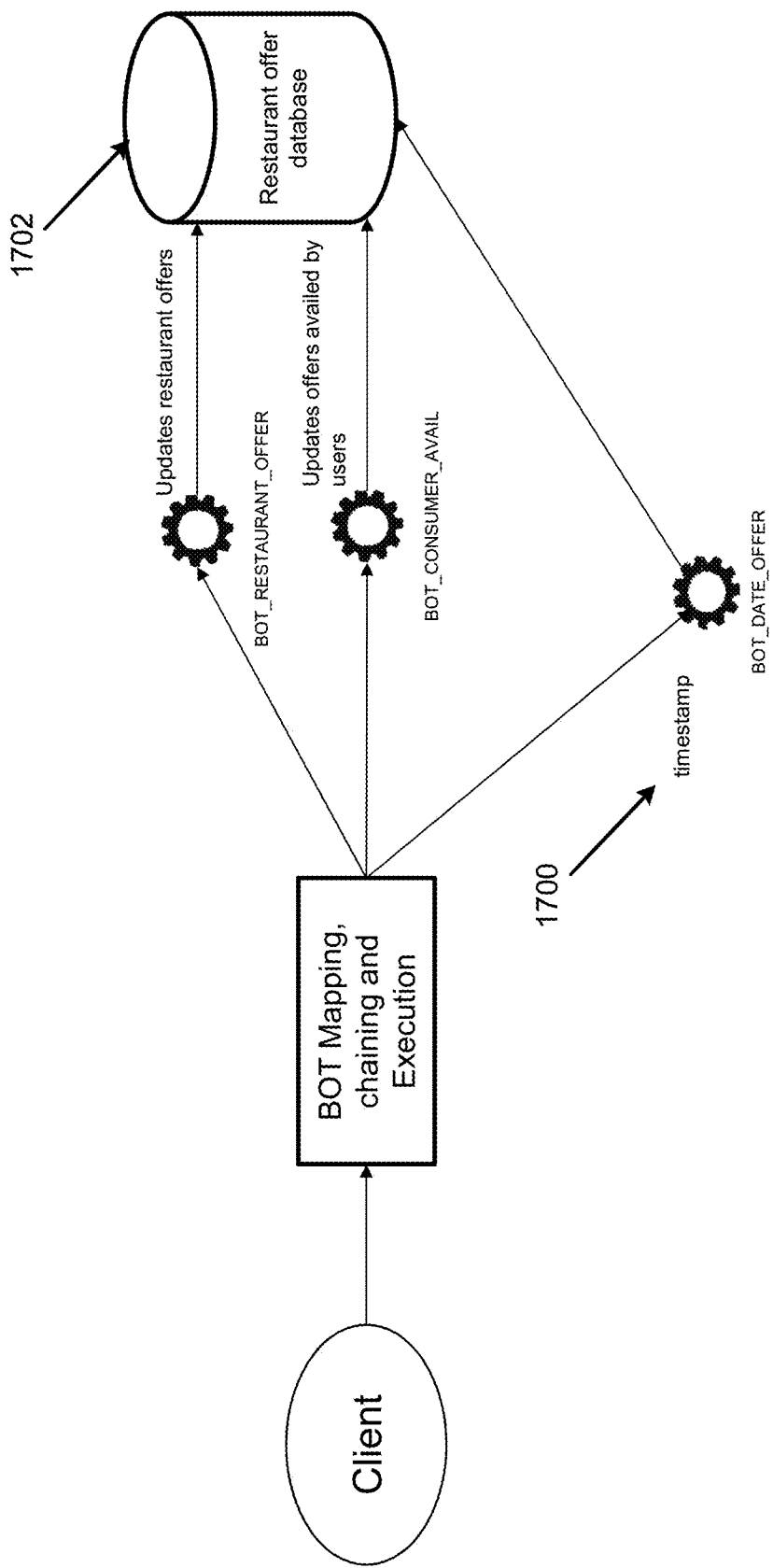
FIG. 17 illustrates a serverless architecture with respect to the telecom location based marketing example of FIGS. 10-14 for the intent and bot based query guidance system of FIG. 1, according to an example of the present disclosure.

FIG. 17 illustrates a serverless architecture with respect to the telecom location based marketing example of FIGS. 10-14 for the system 100, according to an example of the present disclosure.

In order to execute the query 104 of FIG. 11 (i.e., "How many users availed the restaurant promotional offers during the last month"), the "BOT_RESTAURANT_OFFER" bot may update the restaurant offers, and the "BOT_CONSUMER_AVAIL" bot may update offers available by users. Further, a parameter input to the "BOT_DATE_OFFER" bot includes a timestamp (i.e., associated with last month) as shown at 1700, where the "BOT_DATE_OFFER" bot may be identified for execution to update a restaurant offer database at 1702 to respond to the query 104.

Figure 18:
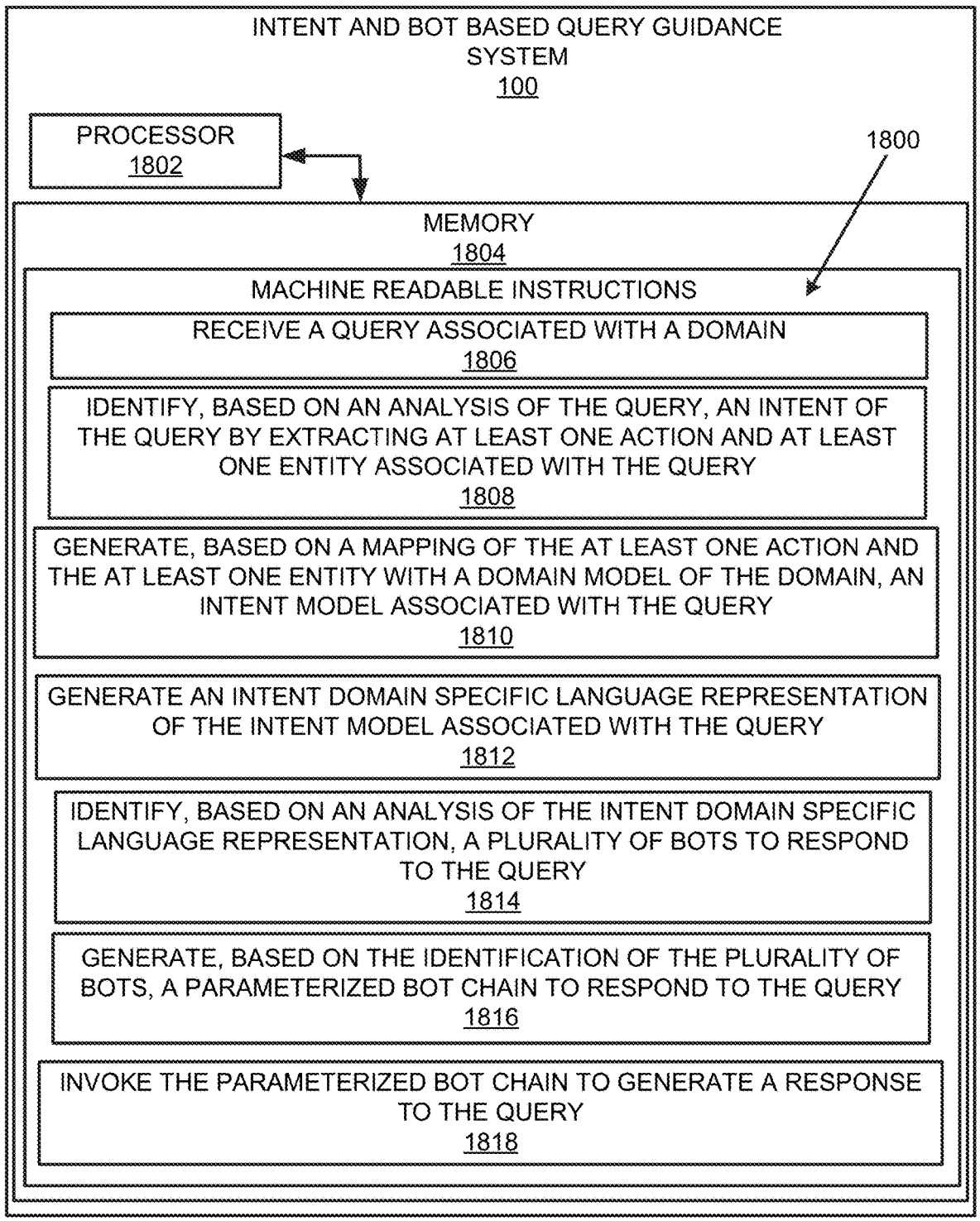
FIG. 18 illustrates a block diagram for intent and bot based query guidance, according to an example of the present disclosure.
Figure 19:
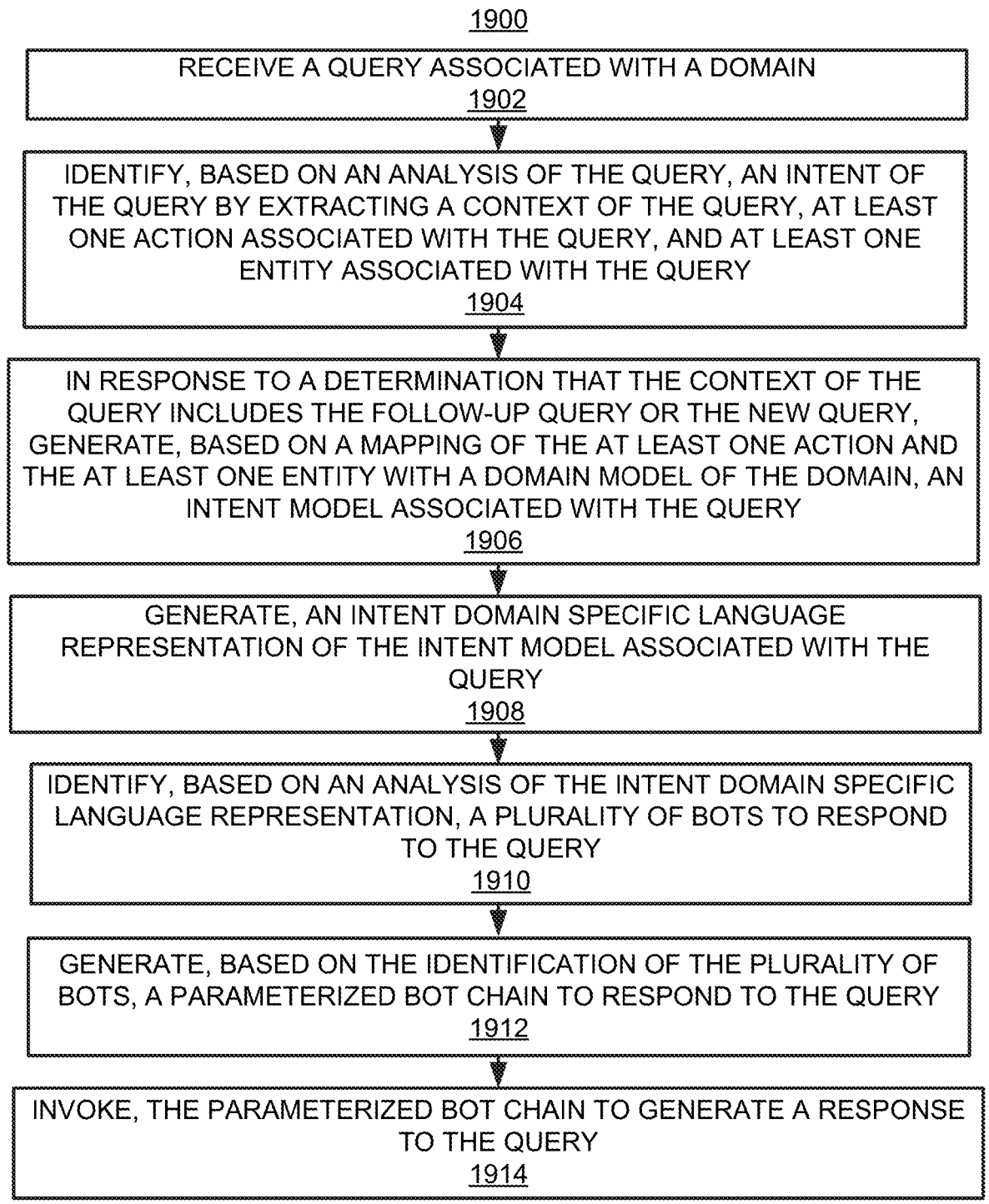
FIG. 19 illustrates a flowchart of a method for intent and bot based query guidance, according to an example of the present disclosure.
Figure 20:
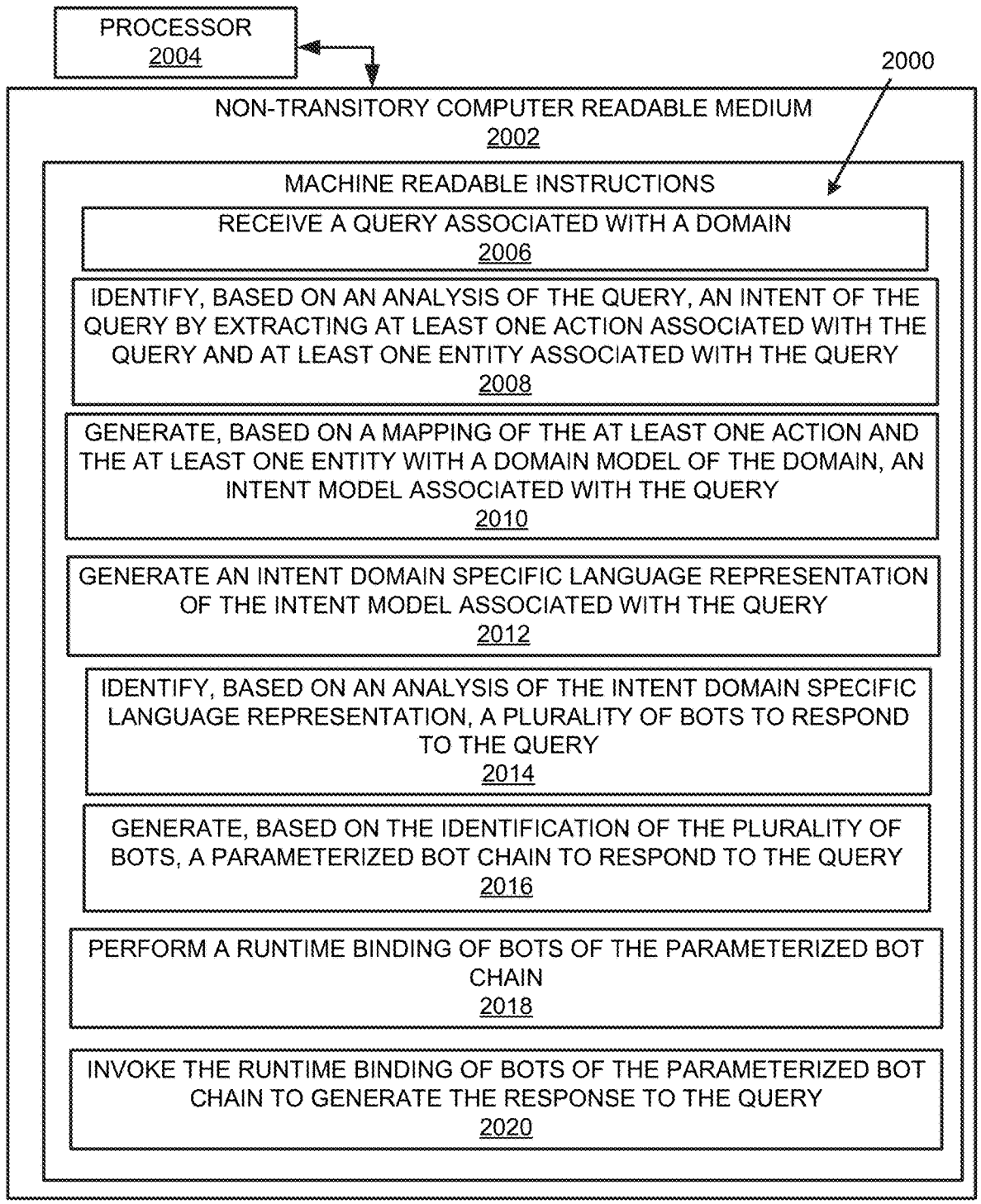
FIG. 20 illustrates a further block diagram for intent and bot based query guidance, according to an example of the present disclosure.

FIGS. 18-20 respectively illustrate a block diagram 1800, a flowchart of a method 1900, and a further block diagram 2000 for intent and bot based query guidance, according to examples. The block diagram 1800, the method 1900, and the block diagram 2000 may be implemented on the system 100 described above with reference to FIG. 1 by way of example and not limitation. The block diagram 1800, the method 1900, and the block diagram 2000 may be practiced in other systems. In addition to showing the block diagram 1800, FIG. 18 shows hardware of the system 100 that may execute the instructions of the block diagram 1800. The hardware may include a processor 1802, and a memory 1804 storing machine readable instructions that when executed by the processor cause the processor to perform the instructions of the block diagram 1800. The memory 1804 may represent a non-transitory computer readable medium. FIG. 19 may represent a method for intent and bot based query guidance, and the steps of the method. FIG. 20 may represent a non-transitory computer readable medium 2002 having stored thereon machine readable instructions to provide intent and bot based query guidance. The machine readable instructions, when executed, cause a processor 2004 to perform the instructions of the block diagram 2000 also shown in FIG. 20.

The processor 1802 of FIG. 18 and/or the processor 2004 of FIG. 20 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2002 of FIG. 20), such as hardware storage devices (e.g., RAM (random access memory), ROM (read only memory), EPROM (erasable, programmable ROM), EEPROM (electrically erasable, programmable ROM), hard drives, and flash memory). The memory 1804 may include a RAM, where the machine readable instructions and data for a processor may reside during runtime.

Referring to FIGS. 1-18, and particularly to the block diagram 1800 shown in FIG. 18, at block 1806, the memory 1804 may include instructions to receive (e.g., by the intent identifier 102) the query 104 associated with a domain.

At block 1808, the memory 1804 may include instructions to identify (e.g., by the intent identifier 102), based on an analysis of the query 104, an intent 110 of the query 104 by extracting at least one action and at least one entity associated with the query 104.

At block 1810, the memory 1804 may include instructions to generate (e.g., by the intent identifier 102), based on a mapping of the at least one action and the at least one entity with a domain model 118 of the domain, an intent model 124 associated with the query 104.

At block 1812, the memory 1804 may include instructions to generate (e.g., by the intent identifier 102) an intent domain specific language representation 126 of the intent model 124 associated with the query 104.

At block 1814, the memory 1804 may include instructions to identify (e.g., by the bot mapper 128), based on an analysis of the intent domain specific language representation 126, a plurality of bots 130 to respond to the query 104.

At block 1816, the memory 1804 may include instructions to generate (e.g., by the bot mapper 128), based on the identification of the plurality of bots 130, a parameterized bot chain 134 to respond to the query 104.

At block 1818, the memory 1804 may include instructions to invoke (e.g., by the query intent analyzer 140) the parameterized bot chain 134 to generate a response to the query 104.

According to examples, for the block diagram 1800 shown in FIG. 18, the memory 1804 may include instructions to identify, based on the analysis of the query 104, the intent of the query 104 by extracting a context of the query 104, the at least one action associated with the query 104, and the at least one entity associated with the query 104. The context of the query 104 may be based on a comparison of the query 104 with previously processed queries.

According to examples, for the block diagram 1800 shown in FIG. 18, the memory 1804 may include instructions to identify, based on the analysis of the query 104, the intent of the query 104 by extracting a context of the query 104, the at least one action associated with the query 104, and the at least one entity associated with the query 104. The context of the query 104 may be based on a determination of whether the query 104 is a similar query to a previously processed query, a follow-up query to the previously processed query, or a new query, based on a comparison of the query 104 with previously processed queries.

According to examples, for the block diagram 1800 shown in FIG. 18, the memory 1804 may include instructions to identify, based on the analysis of the query 104, the intent of the query 104 by extracting temporal values associated with the query 104, the at least one action associated with the query 104, and the at least one entity associated with the query 104. The temporal values may provide an indication of a sequence of the at least one action (or a plurality of actions) with respect to the query 104.

According to examples, for the block diagram 1800 shown in FIG. 18, the memory 1804 may include instructions to generate, based on the mapping of the at least one action and the at least one entity with the domain model 118 of the domain to respectively identify at least one equivalent action in the domain model 118 and at least one equivalent entity in the domain model 118, the intent model 124 associated with the query 104.

According to examples, for the block diagram 1800 shown in FIG. 18, the memory 1804 may include instructions to generate the intent domain specific language representation 126 of the intent model 124 associated with the query 104 by encoding the mapped at least one action and the mapped at least one entity with temporal logic that specifies a sequential arrangement of the at least one action associated with the query 104.

According to examples, for the block diagram 1800 shown in FIG. 18, the memory 1804 may include instructions to identify, based on the analysis of temporal logic associated with the intent domain specific language representation 126, the plurality of bots 130 to respond to the query 104. The temporal logic may represent a sequence of logical modules that form the intent model 124.

According to examples, for the block diagram 1800 shown in FIG. 18, the memory 1804 may include instructions to aggregate a plurality of parameterized bot chains including the parameterized bot chain to generate aggregated parameterized bot chains. The plurality of parameterized bot chains may be associated with queries that are related to the query 104. The memory 1804 may include instructions to invoke the parameterized bot chain to generate the response to the query 104 by invoking the aggregated parameterized bot chains to generate the response to the query 104.

According to examples, for the block diagram 1800 shown in FIG. 18, the memory 1804 may include instructions to aggregate the plurality of parameterized bot chains including the parameterized bot chain based on a union of each of the parameterized bot chains.

Referring to FIGS. 1-17, and 19, and particularly FIG. 19, for the method 1900, at block 1902, the method may include receiving a query 104 associated with a domain.

At block 1904, the method may include identifying based on an analysis of the query 104, an intent 110 of the query 104 by extracting a context of the query 104, at least one action associated with the query 104, and at least one entity associated with the query 104. The context of the query 104 may be based on a determination of whether the query 104 is a similar query to a previously processed query, a follow-up query to the previously processed query, or a new query, based on a comparison of the query 104 with previously processed queries.

At block 1906, in response to a determination that the context of the query 104 includes the follow-up query 104 or the new query 104, the method may include generating based on a mapping of the at least one action and the at least one entity with a domain model 118 of the domain, an intent model 124 associated with the query 104.

At block 1908, the method may include generating an intent domain specific language representation 126 of the intent model 124 associated with the query 104.

At block 1910, the method may include identifying based on an analysis of the intent domain specific language representation 126, a plurality of bots 130 to respond to the query 104.

At block 1912, the method may include generating based on the identification of the plurality of bots 130, a parameterized bot chain 134 to respond to the query 104.

At block 1914, the method may include invoking the parameterized bot chain 134 to generate a response to the query 104.

Referring to FIGS. 1-17, and 20, and particularly FIG. 20, for the block diagram 2000, at block 2006, the non-transitory computer readable medium 2002 may include instructions to receive a query 104 associated with a domain.

At block 2008, the non-transitory computer readable medium 2002 may include instructions to identify, based on an analysis of the query 104, an intent 110 of the query 104 by extracting at least one action associated with the query 104 and at least one entity associated with the query 104.

At block 2010, the non-transitory computer readable medium 2002 may include instructions to generate, based on a mapping of the at least one action and the at least one entity with a domain model 118 of the domain, an intent model 124 associated with the query 104.

At block 2012, the non-transitory computer readable medium 2002 may include instructions to generate an intent domain specific language representation 126 of the intent model 124 associated with the query 104.

At block 2014, the non-transitory computer readable medium 2002 may include instructions to identify, based on an analysis of the intent domain specific language representation 126, a plurality of bots 130 to respond to the query 104.

At block 2016, the non-transitory computer readable medium 2002 may include instructions to generate, based on the identification of the plurality of bots 130, a parameterized bot chain 134 to respond to the query 104.

At block 2018, the non-transitory computer readable medium 2002 may include instructions to perform a runtime binding of bots of the parameterized bot chain 134.

At block 2020, the non-transitory computer readable medium 2002 may include instructions to invoke the runtime binding of bots of the parameterized bot chain 134 to generate the response to the query 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An intent and bot based query guidance system comprising:
    at least one processor;
    an intent identifier, executed by the at least one processor to:
        receive a query associated with a domain;
        identify, based on an analysis of the query, an intent of the query by extracting a context of the query, at least one action associated with the query, and at least one entity associated with the query, wherein the context of the query is based on a comparison of the query with previously processed queries;
        generate, based on a mapping of the at least one action and the at least one entity with a domain model of the domain, an intent model associated with the query; and
        generate an intent domain specific language representation of the intent model associated with the query;
    a bot mapper, executed by the at least one processor to:
        identify, based on an analysis of the intent domain specific language representation, a plurality of bots to respond to the query; and
        generate, based on the identification of the plurality of bots, a parameterized bot chain to respond to the query;
    a bot chain aggregator, executed by the at least one processor to:
        aggregate a plurality of parameterized bot chains including the parameterized bot chain to generate aggregated parameterized bot chains, wherein the plurality of parameterized bot chains are associated with queries that are related to the query; and
    a query intent analyzer, executed by the at least one processor to:
        invoke the parameterized bot chain to generate a response to the query by invoking the aggregated parameterized bot chains to generate the response to the query.

2. The intent and bot based query guidance system according to claim 1, wherein the intent identifier is to identify, based on the analysis of the query, the intent of the query by extracting the context of the query, the at least one action associated with the query, and the at least one entity associated with the query by:
    identifying, based on the analysis of the query, the intent of the query by extracting the context of the query, the at least one action associated with the query, and the at least one entity associated with the query, wherein the context of the query is based on a determination of whether the query is a similar query to a previously processed query, a follow-up query to the previously processed query, or a new query, based on the comparison of the query with previously processed queries.

3. The intent and bot based query guidance system according to claim 1, wherein the intent identifier is to identify, based on the analysis of the query, the intent of the query by extracting the context of the query, the at least one action associated with the query, and the at least one entity associated with the query by:
    identifying, based on the analysis of the query, the intent of the query by extracting temporal values associated with the query, the context of the query, the at least one action associated with the query, and the at least one entity associated with the query, wherein the temporal values provide an indication of a sequence of the at least one action with respect to the query.

4. The intent and bot based query guidance system according to claim 1, wherein the intent identifier is to generate, based on the mapping of the at least one action and the at least one entity with the domain model of the domain, the intent model associated with the query by:
    generating, based on the mapping of the at least one action and the at least one entity with the domain model of the domain to respectively identify at least one equivalent action in the domain model and at least one equivalent entity in the domain model, the intent model associated with the query.

5. The intent and bot based query guidance system according to claim 1, wherein the intent identifier is to generate the intent domain specific language representation of the intent model associated with the query by:
    generating the intent domain specific language representation of the intent model associated with the query by encoding the mapped at least one action and the mapped at least one entity with temporal logic that specifies a sequential arrangement of the at least one action associated with the query.

6. The intent and bot based query guidance system according to claim 1, wherein the bot mapper is to identify, based on the analysis of the intent domain specific language representation, the plurality of bots to respond to the query by:
    identifying, based on the analysis of temporal logic associated with the intent domain specific language representation, the plurality of bots to respond to the query, wherein the temporal logic represents a sequence of logical modules that form the intent model.

7. The intent and bot based query guidance system according to claim 1, wherein the bot chain aggregator is to aggregate the plurality of parameterized bot chains including the parameterized bot chain by:
    aggregating the plurality of parameterized bot chains including the parameterized bot chain based on a union of each of the parameterized bot chains.

8. The intent and bot based query guidance system according to claim 1, wherein the query intent analyzer is to invoke the parameterized bot chain to generate the response to the query by:
    performing a runtime binding of bots of the parameterized bot chain; and
    invoking the runtime binding of bots of the parameterized bot chain to generate the response to the query.

9. A method for intent and bot based query guidance, the method comprising:
    receiving, by at least one processor, a query associated with a domain;
    identifying, by the at least one processor, based on an analysis of the query, an intent of the query by extracting a context of the query, at least one action associated with the query, and at least one entity associated with the query, wherein the context of the query is based on a determination of whether the query is a similar query to a previously processed query, a follow-up query to the previously processed query, or a new query, based on a comparison of the query with previously processed queries;

in response to a determination that the context of the query includes the follow-up query or the new query, generating, by the at least one processor, based on a mapping of the at least one action and the at least one entity with a domain model of the domain, an intent model associated with the query;

generating, by the at least one processor, an intent domain specific language representation of the intent model associated with the query;

identifying, by the at least one processor, based on an analysis of the intent domain specific language representation, a plurality of bots to respond to the query;

generating, by the at least one processor, based on the identification of the plurality of bots, a parameterized bot chain to respond to the query;

aggregating, by the at least one processor, a plurality of parameterized bot chains including the parameterized bot chain to generate aggregated parameterized bot chains, wherein the plurality of parameterized bot chains are associated with queries that are related to the query; and invoking, by the at least one processor, the parameterized bot chain to generate a response to the query by invoking the aggregated parameterized bot chains to generate the response to the query.

10. The method for intent and bot based query guidance according to claim 9, wherein identifying, by the at least one processor, based on the analysis of the query, the intent of the query by extracting the context of the query, the at least one action associated with the query, and the at least one entity associated with the query further comprises:

identifying, by the at least one processor, based on the analysis of the query, the intent of the query by extracting temporal values associated with the query, the context of the query, the at least one action associated with the query, and the at least one entity associated with the query, wherein the temporal values provide an indication of a sequence of the at least one action with respect to the query.

11. The method for intent and bot based query guidance according to claim 9, wherein generating, by the at least one processor, based on the mapping of the at least one action and the at least one entity with the domain model of the domain, the intent model associated with the query further comprises:

generating, by the at least one processor, based on the mapping of the at least one action and the at least one entity with the domain model of the domain to respectively identify at least one equivalent action in the domain model and at least one equivalent entity in the domain model, the intent model associated with the query.

12. The method for intent and bot based query guidance according to claim 9, wherein generating, by the at least one processor, the intent domain specific language representation of the intent model associated with the query further comprises:

generating, by the at least one processor, the intent domain specific language representation of the intent model associated with the query by encoding the mapped at least one action and the mapped at least one entity with temporal logic that specifies a sequential arrangement of the at least one action associated with the query.

13. The method for intent and bot based query guidance according to claim 9, wherein identifying, by the at least one processor, based on the analysis of the intent domain specific language representation, the plurality of bots to respond to the query further comprises:

identifying, by the at least one processor, based on the analysis of temporal logic associated with the intent domain specific language representation, the plurality of bots to respond to the query, wherein the temporal logic represents a sequence of logical modules that form the intent model.

14. The method for intent and bot based query guidance according to claim 9, wherein invoking the parameterized bot chain to generate the response to the query further comprises:

performing a runtime binding of bots of the parameterized bot chain; and invoking the runtime binding of bots of the parameterized bot chain to generate the response to the query.

15. A non-transitory computer readable medium having stored thereon machine readable instructions for intent and bot based query guidance, the machine readable instructions, when executed, cause a processor to:

receive a query associated with a domain;

identify, based on an analysis of the query, an intent of the query by extracting a context of the query, at least one action associated with the query, and at least one entity associated with the query, wherein the context of the query is based on a comparison of the query with previously processed queries;

generate, based on a mapping of the at least one action and the at least one entity with a domain model of the domain, an intent model associated with the query;

generate an intent domain specific language representation of the intent model associated with the query;

identify, based on an analysis of the intent domain specific language representation, a plurality of bots to respond to the query;

generate, based on the identification of the plurality of bots, a parameterized bot chain to respond to the query;

perform a runtime binding of bots of the parameterized bot chain; and invoke the runtime binding of bots of the parameterized bot chain to generate the response to the query.

16. The non-transitory computer readable medium of claim 15, wherein the machine readable instructions to identify, based on the analysis of the query, the intent of the query by extracting context of the query, the at least one action associated with the query, and the at least one entity associated with the query, when executed, further cause the processor to:

identify, based on the analysis of the query, the intent of the query by extracting the context of the query, the at least one action associated with the query, and the at least one entity associated with the query, wherein the context of the query is based on a determination of whether the query is a similar query to a previously processed query, a follow-up query to the previously processed query, or a new query, based on the comparison of the query with previously processed queries.

17. The non-transitory computer readable medium of claim 15, further comprising machine readable instructions, when executed, further cause the processor to:

aggregate a plurality of parameterized bot chains including the parameterized bot chain to generate aggregated parameterized bot chains, wherein the plurality of parameterized bot chains are associated with queries that are related to the query, wherein the machine readable instructions to perform the runtime binding of bots of the parameterized bot chain and invoke the runtime binding of bots of the parameterized bot chain to generate the response to the query, when executed, further cause the processor to:
perform the runtime binding of bots of the aggregated parameterized bot chains; and
invoke the aggregated parameterized bot chains to generate the response to the query.

18. The non-transitory computer readable medium of claim 17, wherein the machine readable instructions to aggregate the plurality of parameterized bot chains including the parameterized bot chain, when executed, further cause the processor to:
aggregate the plurality of parameterized bot chains including the parameterized bot chain based on a union of each of the parameterized bot chains.

19. The non-transitory computer readable medium of claim 15, wherein the machine readable instructions to identify, based on the analysis of the query, the intent of the query by extracting the context of the query, the at least one action associated with the query, and the at least one entity associated with the query, when executed, further cause the processor to:
identify, based on the analysis of the query, the intent of the query by extracting temporal values associated with the query, the context of the query, the at least one action associated with the query, and the at least one entity associated with the query, wherein the temporal values provide an indication of a sequence of the at least one action with respect to the query.

20. The non-transitory computer readable medium of claim 15, wherein the machine readable instructions to generate, based on the mapping of the at least one action and the at least one entity with the domain model of the domain, the intent model associated with the query, when executed, further cause the processor to:
generate, based on the mapping of the at least one action and the at least one entity with the domain model of the domain to respectively identify at least one equivalent action in the domain model and at least one equivalent entity in the domain model, the intent model associated with the query.

* * * * *

UNITED STATES PATENT AND TRADEMARK OFFICE
CERTIFICATE OF CORRECTION

PATENT NO. : 10,642,913 B2
APPLICATION NO. : 15/421928
DATED : May 5, 2020
INVENTOR(S) : Vibhu Saujanya Sharma et al.

It is certified that error appears in the above-identified patent and that said Letters Patent is hereby corrected as shown below:

On the Title Page

At Item (72), 1st Inventor's name "Vibhu SHARMA" should be "Vibhu Saujanya SHARMA".

Signed and Sealed this
Fourteenth Day of February, 2023

Katherine Kelly Vidal
*Director of the United States Patent and Trademark Office*